(12) United States Patent
Akkarakaran et al.

(10) Patent No.: US 12,047,904 B2
(45) Date of Patent: *Jul. 23, 2024

(54) POSITIONING REFERENCE SIGNAL STAGGERING CONFIGURATION

(71) Applicant: QUALCOMM Incorporated, San Diego, CA (US)

(72) Inventors: Sony Akkarakaran, Poway, CA (US); Tao Luo, San Diego, CA (US); Alexandros Manolakos, Escondido, CA (US); Guttorm Ringstad Opshaug, Redwood City, CA (US); Joseph Binamira Soriaga, San Diego, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/930,037

(22) Filed: Sep. 6, 2022

(65) Prior Publication Data

US 2022/0417896 A1     Dec. 29, 2022

Related U.S. Application Data

(62) Division of application No. 16/844,884, filed on Apr. 9, 2020, now Pat. No. 11,477,754.

(30) Foreign Application Priority Data

Apr. 25, 2019  (GR) ............................. 20190100184

(51) Int. Cl.
*H04W 64/00*   (2009.01)
*G01S 5/02*    (2010.01)
(Continued)

(52) U.S. Cl.
CPC ......... *H04W 64/003* (2013.01); *G01S 5/0236* (2013.01); *G01S 5/10* (2013.01);
(Continued)

(58) Field of Classification Search
CPC . H04W 64/003; H04W 56/001; G01S 5/0236; G01S 5/10; H04B 7/0626; H04L 5/0051; H04L 25/0226
See application file for complete search history.

(56) References Cited

U.S. PATENT DOCUMENTS 11,477,754  B2    10/2022  Akkarakaran et al.
11,515,977  B2 *  11/2022  Da ........................ H04L 5/0094
(Continued)

FOREIGN PATENT DOCUMENTS

CN    102472809 A    5/2012
CN    102823308 A    12/2012
(Continued)

OTHER PUBLICATIONS

Huawei: "DL and UL Reference Signals for NR Positioning", 3GPP Draft; 3GPP TSG RAN WG1 Meeting #96bis, R1-1904004, 3rd Generation Partnership Project (3GPP), vol. RAN WG1, No. Xi'an, China; Apr. 8, 2019-Apr. 12, 2019, Apr. 2, 2019 (Apr. 2, 2019), XP051707080, 13 Pages, Retrieved from the Internet: URL: http://www.3gpp.org/ftp/tsg%5Fran/WG1%5FRL1/TSGR1%5F96b/Docs/R1%2D1904004%2Ezip [retrieved on Apr. 2, 2019], The whole document, Section 1, paragraph [02.3]-paragraph [02.4], p. 3.

(Continued)

*Primary Examiner* — Khai M Nguyen
(74) *Attorney, Agent, or Firm* — Procopio, Cory, Hargreaves & Savitch LLP/Qualcomm

(57) ABSTRACT

Disclosed are methods and apparatuses for resolving aliasing ambiguities produced when using channel state information reference signal, a sounding reference signal (SRS)

(Continued)

or other transmission as a positioning reference signal (PRS) occupying a subset of tones of a PRS bandwidth. The aliasing ambiguity results in a plurality of different possible positioning measurements, such as time of arrival (TOA), reference signal timing difference (RSTD), or reception to transmission difference (Rx-Tx). The aliasing ambiguity may be resolved using a previous position estimate that may be used to produce an approximation of the expected positioning measurement. A position estimate may be generated using a multiple stage PRS configuration, in which one or more stages provide a coarse position estimate that has no ambiguity, which can be used to resolve the ambiguity of a more accurate position estimate resulting from the PRS signal.

22 Claims, 16 Drawing Sheets

(51) Int. Cl.
  *G01S 5/10* (2006.01)
  *H04B 7/06* (2006.01)
  *H04L 5/00* (2006.01)
  *H04L 25/02* (2006.01)
  *H04W 56/00* (2009.01)

(52) U.S. Cl.
  CPC ......... *H04B 7/0626* (2013.01); *H04L 5/0051* (2013.01); *H04L 25/0226* (2013.01); *H04W 56/001* (2013.01)

(56) References Cited

U.S. PATENT DOCUMENTS

| | | | |
|---|---|---|---|
| 2011/0039574 A1 | 2/2011 | Charbit et al. | |
| 2016/0065342 A1* | 3/2016 | Mirbagheri | H04L 27/2613 370/330 |
| 2017/0034027 A1 | 2/2017 | Thompson et al. | |
| 2017/0238298 A1* | 8/2017 | Wang | H04W 72/1268 455/452.1 |
| 2017/0359794 A1* | 12/2017 | Fischer | G01S 5/0236 |
| 2018/0054750 A1 | 2/2018 | Lee et al. | |
| 2018/0097596 A1 | 4/2018 | Palanivelu et al. | |
| 2019/0037529 A1* | 1/2019 | Edge | G01S 1/0428 |
| 2019/0053013 A1 | 2/2019 | Markhovsky et al. | |
| 2019/0285722 A1 | 9/2019 | Markhovsky et al. | |
| 2020/0150254 A1* | 5/2020 | Manolakos | G01S 1/0428 |
| 2020/0187149 A1* | 6/2020 | Zhu | G06N 20/00 |
| 2020/0408871 A1* | 12/2020 | Da | G01S 1/20 |
| 2021/0006372 A1* | 1/2021 | Cha | G01S 5/0205 |
| 2022/0171016 A1 | 6/2022 | Manolakos et al. | |

FOREIGN PATENT DOCUMENTS

| | | |
|---|---|---|
| WO | 2010107880 A2 | 9/2010 |
| WO | 2011021153 A1 | 2/2011 |
| WO | 2020072258 A1 | 4/2020 |
| WO | 2020102184 A1 | 5/2020 |

OTHER PUBLICATIONS

Intel Corporation: "Summary for NR-Positioning AI—7.2.10.1.1 DL Only Based Positioning", 3GPP Draft, 3GPP TSG RAN WG1 Meeting #96, R1-1903394—Intel—NR POS AI 7.2.10.1.1—DL POS, 3GPP, vol. RAN WG1, No. Athens, Greece, Feb. 25, 2019-Mar. 1, 2019, Feb. 26, 2019 (Feb. 26, 2019), XP051601069, 22 Pages, Retrieved from Internet: URL: http://www.3gpp.org/ftp/tsg%5Fran/WG1%5FRL1/TSGR1%5F96/Docs/R1%2D1903394%2Ezip, sections 2, 5, [retrieved Feb. 26, 2019], p. 19-p. 20, the whole document.
International Preliminary Report on Patentability—PCT/US2020/027770, The International Bureau of WIPO—Geneva, Switzerland, Nov. 4, 2021.
International Search Report and Written Opinion—PCT/US2020/027770—ISAEPO—Sep. 17, 2020.
Partial International Search Report—PCT/US2020/027770—ISAEPO—Jul. 15, 2020.
Qualcomm Incorporated: "DL & UL Reference Signals for NR Positioning", 3GPP Draft, 3GPP TSG RAN WG1 #96bis, R1-1905033, 3rd Generation Partnership Project (3GPP), vol. RAN WG1, No. Xi'an, China, Apr. 8, 2019-Apr. 12, 2019, Apr. 3, 2019 (Apr. 3, 2019), XP051707369, 10 Pages, Retrieved from the Internet: URL: http://www.3gpp.org/ftp/tsg%5Fran/WG1%5FRL1/TSGR1%5F96b/Docs/R1%2D1905033%2Ezip, [retrieved on Apr. 3, 2019], p. 1, paragraph 3.1-p. 3, figure 1.
Taiwan Search Report—TW109113428—TIPO—Nov. 13, 2023.

* cited by examiner

Comb-1: Contiguous tones

Comb-4: PRS in every 4th tone

POSITIONING REFERENCE SIGNAL STAGGERING CONFIGURATION

CROSS-REFERENCE TO RELATED APPLICATIONS

This application is a divisional of U.S. patent application Ser. No. 16/844,884, entitled "SYSTEMS AND METHODS FOR POSITIONING REFERENCE SIGNAL STAGGERING CONFIGURATION," filed Apr. 9, 2020, which claims the benefit of Greek Patent Application No. 20190100184, entitled "SYSTEMS AND METHODS FOR POSITIONING REFERENCE SIGNAL STAGGERING CONFIGURATION," filed on Apr. 25, 2019, both of which are expressly incorporated herein by reference in their entirety.

TECHNICAL FIELD

The following relates generally to wireless communications, and more specifically to techniques for supporting location services for user equipments (UEs) in a wireless network.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a positioning engine (such as a position measurement function (PMF), LMF, eSMLC) may determine a position or location of a supported UE using radio access network information. The information may be associated with UE-assisted positioning techniques, such as a reference signal transmission, by the base station and reporting of radio signaling measurements by the UE. These methods may support various location services (for example, navigation systems, emergency communications), and supplement one or more additional location systems supported by wireless communications devices (such as global positioning system (GPS) technology). As data traffic increases, however, other reporting of radio signaling measurements fail to provide robust signaling and communication within some environments, including in new radio (NR) systems. Improved techniques and systems are desired.

SUMMARY

Disclosed are methods and apparatuses for resolving aliasing ambiguities produced when using channel state information reference signal, a sounding reference signal (SRS) or other transmission as a positioning reference signal (PRS) occupying a subset of tones of a PRS bandwidth. The aliasing ambiguity results in a plurality of different possible positioning measurements, such as time of arrival (TOA), reference signal timing difference (RSTD), or reception to transmission difference (Rx-Tx). The aliasing ambiguity may be resolved using a previous position estimate that may be used to produce an approximation of the expected positioning measurement. A position estimate may be generated using a multiple stage PRS configuration, in which one or more stages provide a coarse position estimate that has no ambiguity, which can be used to resolve the ambiguity of a more accurate position estimate resulting from the PRS signal.

In one implementation, a method for position location performed by a user equipment (UE), includes receiving from a base station a positioning reference signal (PRS) signal occupying a subset of tones of a PRS bandwidth, wherein the subset of tones of the PRS bandwidth produces a plurality of possible positioning results; and determining a true positioning measurement result based on the plurality of possible positioning measurement results from the received PRS signal.

In one implementation, a user equipment (UE) configured for performing position location, includes a wireless transceiver configured to communicate with base stations in a wireless network; at least one memory; and at least one processor coupled to the wireless transceiver and the at least one memory, the at least one processor configured to: receive from a base station, via the wireless transceiver, a positioning reference signal (PRS) signal occupying a subset of tones of a PRS bandwidth, wherein the subset of tones of the PRS bandwidth produces a plurality of possible positioning results; and determine a true positioning measurement result based on the plurality of possible positioning measurement results from the received PRS signal.

In one implementation, a user equipment (UE) configured for performing position location, includes means for receiving from a base station a positioning reference signal (PRS) signal occupying a subset of tones of a PRS bandwidth, wherein the subset of tones of the PRS bandwidth produces a plurality of possible positioning results; and means for determining a true positioning measurement result based on the plurality of possible positioning measurement results from the received PRS signal.

In one implementation, a non-transitory computer readable storage medium including program code stored thereon, the program code is operable to configure at least one processor in a user equipment (UE) capable of supporting position location, includes program code to receive from a base station a positioning reference signal (PRS) signal occupying a subset of tones of a PRS bandwidth, wherein the subset of tones of the PRS bandwidth produces a plurality of possible positioning results; and program code to determine a true positioning measurement result based on the plurality of possible positioning measurement results from the received PRS signal.

In one implementation, a method for position location for a user equipment (UE) performed by a base station in a wireless network, includes receiving from the UE a positioning reference signal (PRS) signal occupying a subset of tones of a PRS bandwidth, wherein the subset of tones of the PRS bandwidth produces a plurality of possible positioning results; and sending a location information to a positioning engine in the wireless network based on the PRS signal for the positioning engine to determine a true positioning measurement result based on the plurality of possible positioning measurement results from the received PRS signal.

In one implementation, a base station in a wireless network configured for position location for a user equipment (UE), includes a wireless transceiver configured to communicate with UEs in the wireless network; at least one memory; and at least one processor coupled to the wireless transceiver and the at least one memory, the at least one processor configured to: receive from the UE, via the wireless transceiver, a positioning reference signal (PRS) signal occupying a subset of tones of a PRS bandwidth, wherein the subset of tones of the PRS bandwidth produces a plurality of possible positioning results; and send, via the wireless transceiver, a location information to a positioning engine in the wireless network based on the PRS signal for the positioning engine to determine a true positioning measurement result based on the plurality of possible positioning measurement results from the received PRS signal.

In one implementation, a base station in a wireless network configured for position location for a user equipment (UE), includes means for receiving from the UE a positioning reference signal (PRS) signal occupying a subset of tones of a PRS bandwidth, wherein the subset of tones of the PRS bandwidth produces a plurality of possible positioning results; and means for sending a location information to a positioning engine in the wireless network based on the PRS signal for the positioning engine to determine a true positioning measurement result based on the plurality of possible positioning measurement results from the received PRS signal.

In one implementation, a non-transitory computer readable storage medium including program code stored thereon, the program code is operable to configure at least one processor in a base station in a wireless network capable of supporting position location for a user equipment (UE), includes program code to receive from the UE a positioning reference signal (PRS) signal occupying a subset of tones of a PRS bandwidth, wherein the subset of tones of the PRS bandwidth produces a plurality of possible positioning results; and program code to send a location information to a positioning engine in the wireless network based on the PRS signal for the positioning engine to determine a true positioning measurement result based on the plurality of possible positioning measurement results from the received PRS signal.

In one implementation, a method for position location for a user equipment (UE) performed by a positioning engine in a wireless network, includes receiving location information from a first entity in the wireless network determined from a positioning reference signal (PRS) signal occupying a subset of tones of a PRS bandwidth, received by the first entity from a second entity in the wireless network, wherein the first entity is one of the UE and a base station and the second entity is the other of the UE and the base station, wherein the subset of tones of the PRS bandwidth produces a plurality of possible positioning results; and determining a true positioning measurement result based on the plurality of possible positioning measurement results from the received location information.

In one implementation, a positioning engine in a wireless network configured for position location for a user equipment (UE), includes a wireless transceiver configured to communicate with entities in the wireless network; at least one memory; and at least one processor coupled to the wireless transceiver and the at least one memory, the at least one processor configured to: receive, via the wireless transceiver, location information from a first entity in the wireless network determined from a positioning reference signal (PRS) signal occupying a subset of tones of a PRS bandwidth, received by the first entity from a second entity in the wireless network, wherein the first entity is one of the UE and a base station and the second entity is the other of the UE and the base station, wherein the subset of tones of the PRS bandwidth produces a plurality of possible positioning results; and determine a true positioning measurement result based on the plurality of possible positioning measurement results from the received location information.

In one implementation, a positioning engine in a wireless network configured for position location for a user equipment (UE), includes means for receiving location information from a first entity in the wireless network determined from a positioning reference signal (PRS) signal occupying a subset of tones of a PRS bandwidth, received by the first entity from a second entity in the wireless network, wherein the first entity is one of the UE and a base station and the second entity is the other of the UE and the base station, wherein the subset of tones of the PRS bandwidth produces a plurality of possible positioning results; and means for determining a true positioning measurement result based on the plurality of possible positioning measurement results from the received location information.

In one implementation, a non-transitory computer readable storage medium including program code stored thereon, the program code is operable to configure at least one processor in a positioning engine in a wireless network capable of supporting position location for a user equipment (UE), includes program code to receive location information from a first entity in the wireless network determined from a positioning reference signal (PRS) signal occupying a subset of tones of a PRS bandwidth, received by the first entity from a second entity in the wireless network, wherein the first entity is one of the UE and a base station and the second entity is the other of the UE and the base station, wherein the subset of tones of the PRS bandwidth produces a plurality of possible positioning results; and program code to determine a true positioning measurement result based on the plurality of possible positioning measurement results from the received location information.

DETAILED DESCRIPTION

Figure 1:
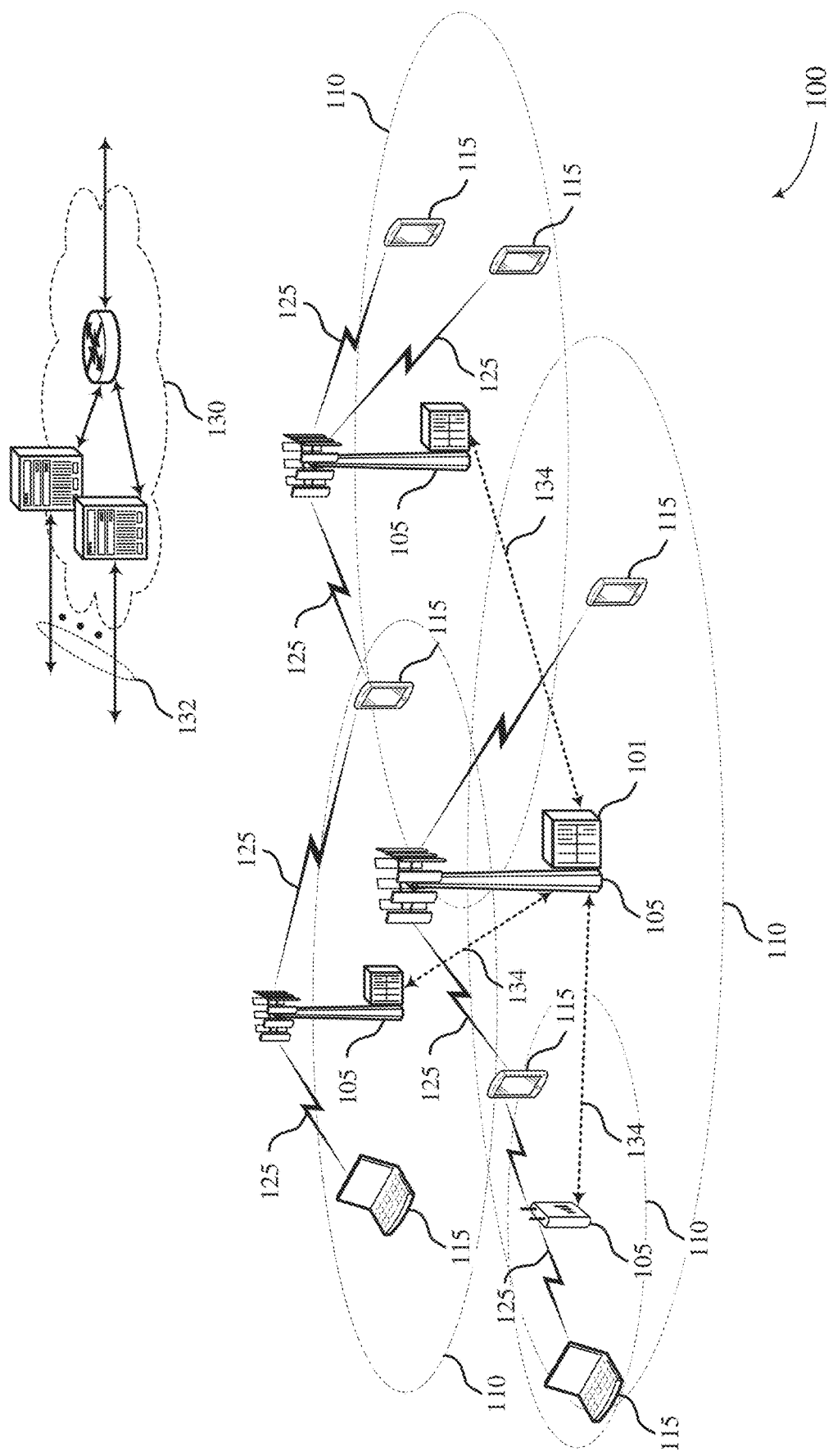
FIG. 1 illustrates an example of a wireless communications system that supports eliminating aliasing ambiguities produced in a comb-N PRS signal for positioning in accordance with aspects of the present disclosure.

In location determination, such as Observed Time Difference of Arrival (OTDOA) based positioning, the UE may measure time differences in received signals from a plurality of base stations. Because positions of the base stations are known, the observed time differences may be used to calculate the location of the terminal. In OTDOA, the mobile station measures the time of arrival (TOA) of signals from a reference cell (e.g., the serving cell) and one or more neighboring cells. The TOA from the reference cell may be subtracted from the TOA from the one or more reference cells to determine the Reference Signal Time Difference (RSTD). Using the RSTD measurements, the absolute or relative transmission timing of each cell, and the known position(s) of the physical transmitting antennas for the reference and neighboring cells, the UE's position may be calculated.

Positioning Reference Signals (PRS) are broadcast by base stations and are used by UEs for positioning in wireless networks, such as a Long Term Evolution (LTE) network, and 5G NR networks, where the UE measures the TOA (Time of Arrival) metric of different cells and reports to the network/server. Channel state information reference signal (CSI-RS) transmissions may be used as PRS signals, but they suffer from aliasing ambiguities, resulting in a plurality of different possible positioning measurements, such as TOA, RSTD, and reception to transmission difference (Rx-Tx), which individually and collectively may be referred to herein as positioning measurements. For clarity, the positioning measurements addressed herein are timing measurements that generate the N-fold timing ambiguity when a comb-N signal is used to determine the timing, as opposed to other non-timing related positioning measurements, such as Reference Signal Received Power (RSRP) or Angle of Arrival (AOA). Accordingly, it should be understood that positioning measurements as used herein are positioning-related timing measurements.

As described herein, the aliasing ambiguity may be resolved using a previously obtained position estimate. The previously obtained position estimate may be approximate, but sufficient to resolve the aliasing ambiguity. The known position of the base station may be used with the previous position estimate to estimate an approximate expected positioning measurement, e.g., TOA, RSTD, Rx-Tx, etc., which can be used to resolve the aliasing ambiguity. For example, out of the plurality of different possible positioning measurements, the true value of the positioning measurement may be the closest match to the expected positioning measurement determined from the previous position estimate. Once the expected positioning measurement is determined, e.g., by a positioning engine, a narrow search window may be configured so that out of the plurality of different possible positioning measurements only the true value of the positioning measurement is found within the search window. The previous position estimate may be obtained, e.g., from a Radio Access Technology (RAT)-dependent, e.g., OTDOA, or RAT-independent, e.g., a Global Navigation Satellite System (GNSS) method, or a combination thereof. In one example, the previous position estimate may be obtained using multiple stages of PRS configurations. For example, a first PRS configuration may produce an approximate position estimate that does not suffer from aliasing ambiguities. The coarse position estimate from the first PRS configuration may be used to resolve the aliasing ambiguity from the second PRS configuration, which provides a more accurate position determination but suffers from aliasing ambiguities. If desired, multiple PRS configurations may be used together to resolve the aliasing ambiguity.

FIG. 1 illustrates an example of a wireless communications system 100 in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling duration of $T_s=1/30,720,000$ seconds. Time intervals of a communications resource may be organized according to radio frames each having a duration of 10 milliseconds (ms), where the frame duration may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol duration may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

As described herein, wireless communications system 100 may be an NR system and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105, or as part of a mobility or beam management procedure for directional transmission associated with the enhanced channel resources.

A base station 105 may configure a CSI-RS transmission on one or more CSI-RS resources of the channel. A CSI-RS resource may start at any OFDM symbol of a slot and occupy one or more symbols depending on a configured number of ports. For example, a CSI-RS resource may span one symbol of a slot and contain one port for transmission. The one or more CSI-RS resources may span a number of CSI-RS resource sets configured according to a CSI-RS resource setting of the base station 105. The structure of the one or more CSI-RS resources, CSI-RS resource sets, and CSI-RS resource settings within a CSI-RS transmission may be referred to as a multi-level resource setting. For example, a multi-level CSI-RS resource setting of the base station 105 may include up to 16 CSI-RS resource sets and each CSI-RS resource set may contain up to 64 CSI-RS resources. In some examples, the base station 105 may support a configured number of distinct CSI-RS resources (for example, 128) over one or more CSI-RS resource sets.

In some examples, a base station 105 may provide an indication (such as the tag "Repetition=ON") associated with a CSI-RS transmission directed to a UE 115. The indication may define whether the UE 115 may assume the included CSI-RS resources within the reference signal (for example, a non-zero power (NZP) CSI-RS transmission) are associated with the same downlink spatial domain transmission filter and correspond to a single transmit beam at the base station 105. The indication may be configured according to a higher layer signaling parameter (for example, report Quantity) associated with all the reporting settings linked with the CSI-RS resource set. For example, the base station 105 may configure the reportQuantity parameter to a set indication (for example "cri-RSRP", "none", etc.) that indicates a single transmit beam.

At reception, the UE 115 may identify the configured set indication associated with the received higher layer signaling parameter. In some examples (such as "cri-RSRP" reporting), the UE 115 may determine CSI parameters for the one or more CSI-RS resources and report the measurements according to a refined reporting configuration. For example, the UE 115 may determine CSI parameters (for example, RSRP values) for the one or more channel resources. The UE 115 may then condition the reporting according to a configured channel resource indicator (CRI) value, as one example, where the CRI value corresponds to an index of a resource entry associated with the one or more CSI-RS resources in a corresponding CSI-RS resource set for channel measurement.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRB s) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx–Tx), a signal-to-noise ratio (SNR), or a reference signal receive quality (RSRQ).

Wireless communications system 100 may be or include a multicarrier beamformed communication system, such as a mmW wireless communication system. Aspects of wireless communications system 100 may include use of PRS transmissions by the base station 105 or sounding reference signal (SRS) transmissions by the UE 115 for UE location determination. For downlink-based UE location determination, a positioning engine 101, e.g., a location server such as a Location Management Function (LMF) in a NR network or a Secure User Plane Location (SUPL) Location Platform (SLP) in LTE, may be used to provide PRS assistance data (AD) to the UE 115. In UE-assisted positioning, the positioning engine may receive measurement reports from the UE 115 that indicates position measurements for one or multiple base stations 105 with which positioning engine may determine a position estimate for the UE 115, e.g., using OTDOA, or other desired techniques. The positioning engine 101 is illustrated in FIG. 1 as being located at a base station 105, but may be located elsewhere, e.g., within the core network 130.

For uplink-based UE location determination, the base station 105 may receive SRS transmissions from the UE 115 and determine position measurements, such as TOA or Rx–Tx. A positioning engine 101 may receive measurement reports from one or more base stations 105 with the position measurements and may determine a position estimate for the UE 115, e.g., using OTDOA or other desired techniques.

Additionally, RAT independent techniques may be used to estimate a position of the UE 115. For example, the communications system 100 may further utilize information from space vehicles (SVs) (not illustrated) for a Global Navigation Satellite System (GNSS) like GPS, GLONASS, Galileo or Beidou or some other local or regional Satellite Positioning System (SPS) such as IRNSS, EGNOS or WAAS. Location related measurements obtained by UE 115 may include measurements of signals received from the SVs and/or may include measurements of signals received from terrestrial transmitters fixed at known locations (e.g., such as base stations 105). The UE 115 or positioning engine 101 to which UE 115 may send the measurements, may then obtain a location estimate for the UE 115 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g., A-GNSS, AFLT and OTDOA), pseudoranges or timing differences may be measured at UE 115 relative to three or more terrestrial transmitters (e.g., base stations 105) fixed at known locations or relative to four or more SVs with accurately known orbital data, or combinations thereof, based at least in part, on pilots, positioning reference signals (PRS) or other positioning related signals transmitted by the transmitters or satellites and received at the UE 115.

Figure 2:
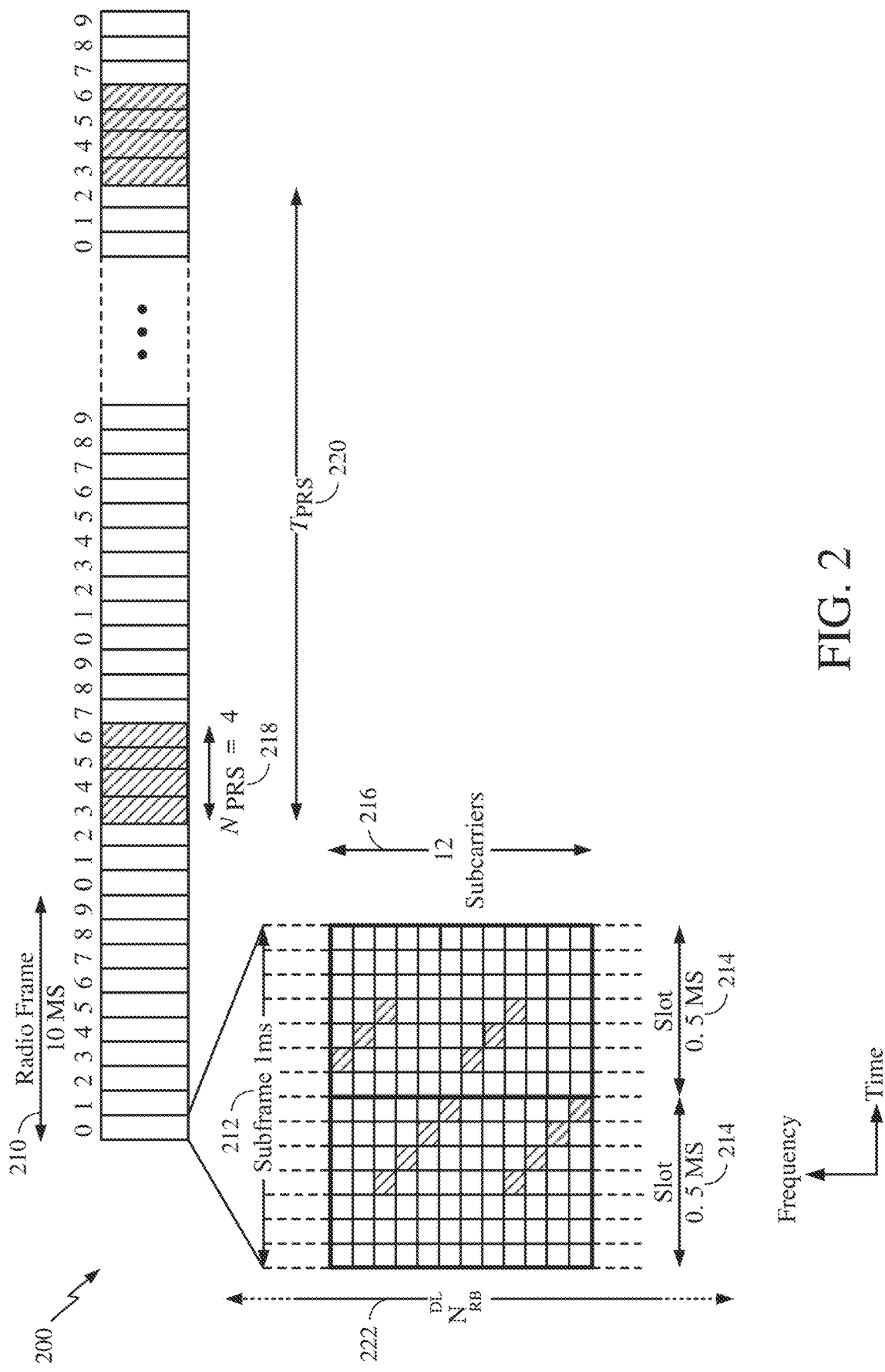
FIG. 2 is a diagram of a structure of an example LTE subframe sequence with Positioning Reference Signaling (PRS) positioning occasions.

FIG. 2 shows a structure of an example subframe sequence 200 with PRS positioning occasions. Subframe sequence 200 may be applicable to broadcast of PRS signals from base stations 105 in communication systems 100. While FIG. 2 provides an example of a subframe sequence for LTE, similar subframe sequence implementations may be realized for other communication technologies/protocols, such as 5G and NR. In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink Radio Frames 210 may be of 10 ms duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration, is indicated as $N_{RB}^{DL}$. For example, for a 3 MHz channel bandwidth in the above example, the number of available resource blocks on each channel 222 is given by $N_{RB}^{DL}=15$.

In the communication system 100 illustrated in FIG. 1, a base station 105, such as macro cell base station or any of small cell base stations, may transmit frames, or other physical layer signaling sequences, supporting PRS signals (i.e. a downlink (DL) PRS) according to frame configurations either similar to, or the same as that, shown in FIG. 2 and (as described later) in FIG. 3, which may be measured and used for UE (e.g., UE 115) position determination. As noted, other types of wireless nodes and base stations (e.g., a gNB or WiFi AP) may also be configured to transmit PRS signals configured in a manner similar to (or the same as) that depicted in FIGS. 2 and 3. Since transmission of a PRS by a wireless node or base station is directed to all UEs within radio range, a wireless node or base station can also be considered to transmit (or broadcast) a PRS.

A PRS, which has been defined in Third Generation Partnership Project (3GPP) LTE Release-9 and later releases, may be transmitted by wireless nodes (e.g., base stations 105) after appropriate configuration (e.g., by an Operations and Maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2 illustrates a periodicity of positioning occasions where $N_{PRS}$ equals 4 218 and $T_{PRS}$ is greater than or equal to 20 220. In some aspects, $T_{PRS}$ may be measured in terms of the number of subframes between the start of consecutive positioning occasions.

As discussed herein, in some aspects, OTDOA assistance data may be provided to a UE 115 by a location server, e.g., positioning engine 101 for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method.

PRS-based positioning by a UE 115 may be facilitated by indicating the serving cell for the UE 115 in the OTDOA assistance data (e.g., with the reference cell indicated as being the serving cell).

In some aspects, OTDOA assistance data may also include "expected RSTD" parameters, which provide the UE 115 with information about the RSTD values the UE 115 is expected to measure at its current location between the reference cell and each neighbor cell, together with an uncertainty of the expected RSTD parameter. The expected RSTD, together with the associated uncertainty, may define a search window for the UE 115 within which the UE 115 is expected to measure the RSTD value. OTDOA assistance information may also include PRS configuration information parameters, which allow a UE 115 to determine when a PRS positioning occasion occurs on signals received from various neighbor cells relative to PRS positioning occasions for the reference cell, and to determine the PRS sequence transmitted from various cells in order to measure a signal Time of Arrival (ToA) or RSTD.

Using the RSTD measurements, the known absolute or relative transmission timing of each cell, and the known position(s) of wireless node physical transmitting antennas for the reference and neighboring cells, the UE 115's position may be calculated (e.g., by the UE 115 or by the positioning engine 101). More particularly, the RSTD for a neighbor cell "k" relative to a reference cell "Ref," may be given as $(ToA_k - ToA_{Ref})$, where the ToA values may be measured modulo one subframe duration (1 ms) to remove the effects of measuring different subframes at different times. ToA measurements for different cells may then be converted to RSTD measurements (e.g., as defined in 3GPP Technical Specification (TS) 36.214 entitled "Physical layer; Measurements") and sent to the positioning engine 101 by the UE 115. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 115's position may be determined.

Figure 3:
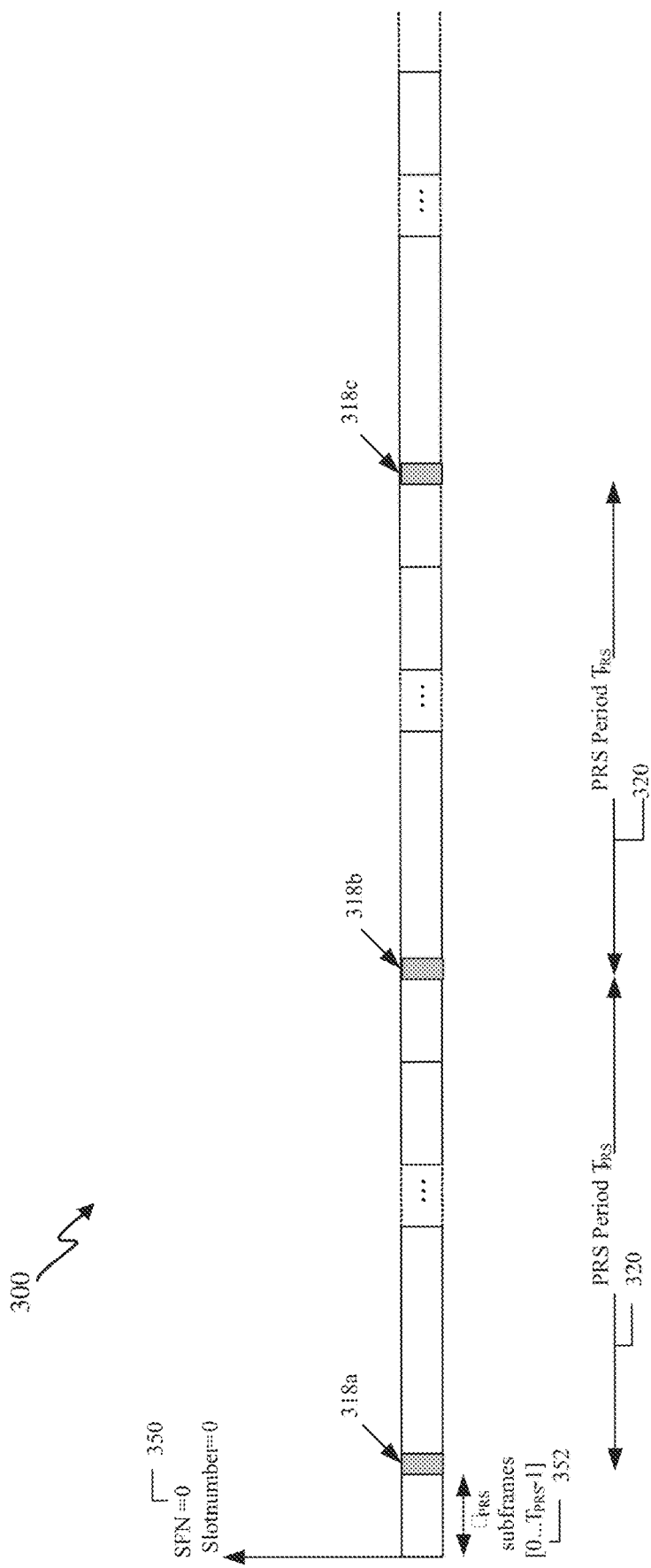
FIGS. 3 and 4 are diagrams illustrating further aspects of PRS transmission for a cell supported by a wireless node.

FIG. 3 illustrates an exemplary PRS configuration 300 for a cell supported by a wireless node (such as a base station 105). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell-specific subframe offset ($\Delta_{PRS}$) 352, and the PRS Periodicity ($T_{PRS}$) 320. Typically, the cell specific PRS subframe configuration is defined by a "PRS Configuration Index" $I_{PRS}$ included in the OTDOA assistance data. The PRS Periodicity ($T_{PRS}$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity ($T_{PRS}$) 320, and $\Delta_{PRS}$ is the cell-specific subframe offset ($\Delta_{PRS}$) 352.

As shown in FIG. 3, the cell specific subframe offset ($\Delta_{PRS}$) 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

In some aspects, when a UE 115 receives a PRS configuration index $I_{PRS}$ in the OTDOA assistance data for a particular cell, the UE 115 may determine the PRS periodicity ($T_{PRS}$) 320 and PRS subframe offset $\Delta_{PRS}$ using Table 1. The UE 115 may then determine the radio frame, subframe and slot when a PRS is scheduled in the cell (e.g., using equation (1)). The OTDOA assistance data may be determined by, for example, the positioning engine 101, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355. A directional PRS may be configured as just described according to 3GPP TSs and may, for example, use a low PRS duty cycle (e.g., $N_{PRS}=1$, $T_{PRS}=160$ subframes) or a high duty cycle.

Figure 4:
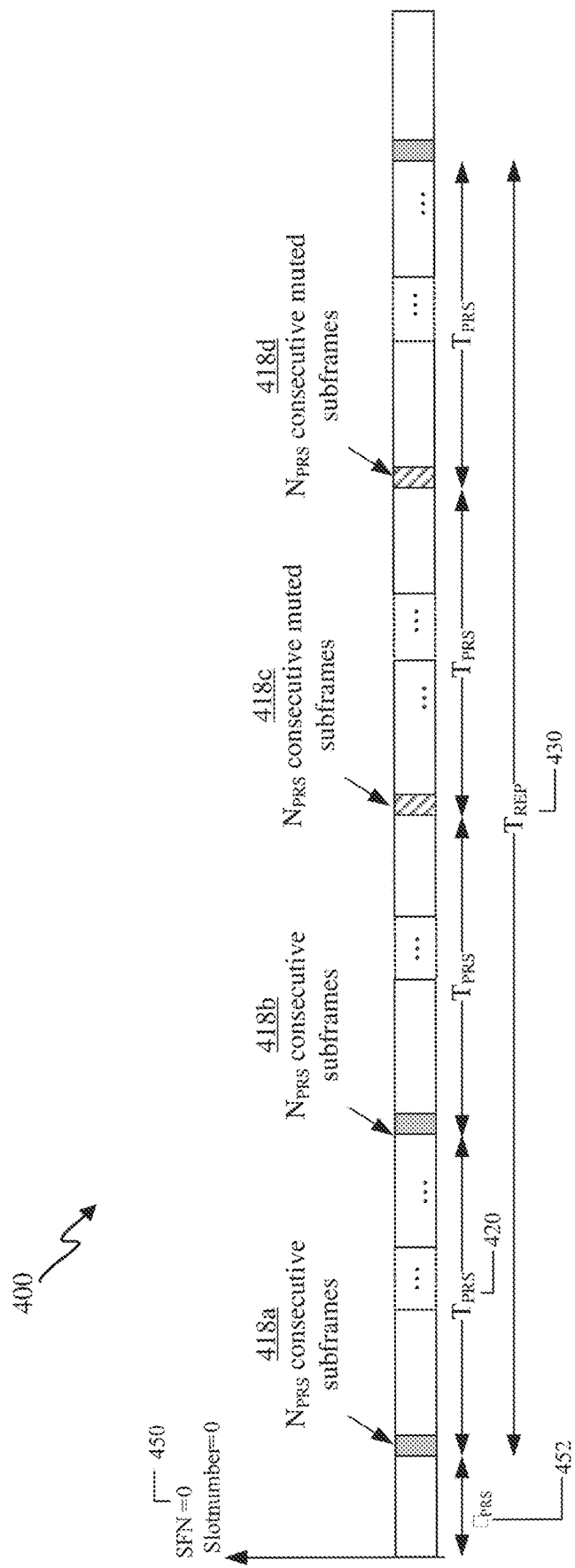

FIG. 4 illustrates an exemplary PRS configuration 400 in LTE that includes a PRS muting sequence. Like FIG. 3, FIG. 4 shows how PRS positioning occasions are determined by an SFN, a cell specific subframe offset ($\Delta_{PRS}$) 452, and the PRS Periodicity ($T_{PRS}$) 420. As shown in FIG. 4, the cell specific subframe offset ($\Delta_{PRS}$) 452 may be defined in terms of the number of subframes transmitted starting from System Frame Number 0 (Slot 'Number 0', marked as slot 450) to the start of the first (subsequent) PRS positioning occasion. In the example in FIG. 4, the number of consecutive positioning subframes ($N_{PRS}$) in each of the consecutive PRS positioning occasions 418a and 418b equals 4.

Within each positioning occasion, PRS are generally transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and ToA and RSTD measurement, by UEs (such as the UE 115), of PRS signals that are not muted (by avoiding interference from PRS signals that have been muted). For example, when the (strong) PRS signal the UE 115 receives from one base station 105 is muted, the (weak) PRS signals from a neighboring base station 105 can be more easily detected by the UE 115. Muting may be viewed as the non-transmission of a PRS for a given positioning occasion for a particular cell. Muting patterns (also referred to as muting sequences) may be signaled to a UE 115 using bit strings. For example, in a bit string signaled to indicate a muting pattern, if a bit at position j is set to '0', then the UE 115 may infer that the PRS is muted for a $j^{th}$ positioning occasion.

With reference to FIG. 4, the muting sequence periodicity $T_{REP}$ 430 includes two consecutive PRS positioning occasions 418a and 418b followed by two consecutive muted PRS positioning occasions 418c and 418d. In LTE, the PRS muting configuration of a cell is only defined by a periodic muting sequence (e.g., muting sequence periodicity $T_{REP}$ 430), as opposed to an aperiodic or semi-persistent muting sequence. As such, the two consecutive PRS positioning occasions 418a and 418b followed by the two consecutive muted PRS positioning occasions 418c and 418d will repeat for the next muting sequence periodicity $T_{REP}$ 430.

To further improve hearability of PRS, positioning subframes may be low-interference subframes that are transmitted without user data channels. As a result, in ideally synchronized networks, PRS may receive interference from other cell's PRS with the same PRS pattern index (i.e., with the same frequency shift), but not from data transmissions. The frequency shift, in LTE, for example, is defined as a function of a PRS ID for a cell or other transmission point (TP) (denoted as $N_{ID}^{PRS}$) or as a function of a Physical Cell Identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration (e.g., PRS configuration 400/500), where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

Figure 5:
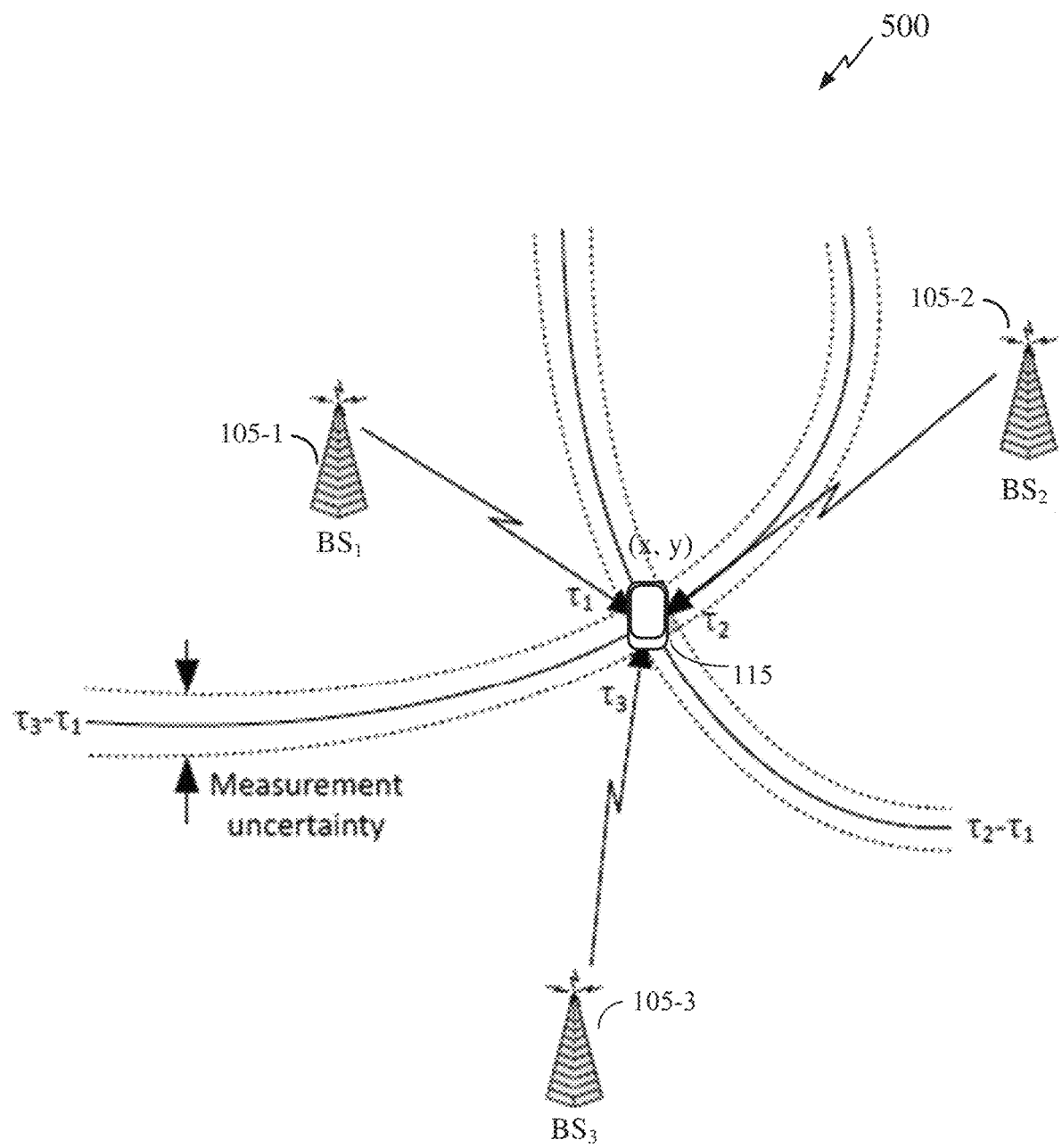
FIG. 5 is a diagram illustrating an exemplary technique for determining a position of a mobile device using information obtained from a plurality of base stations.

FIG. 5 illustrates an exemplary wireless communications system 500 according to various aspects of the disclosure. In the example of FIG. 5, a UE 115 is attempting to calculate an estimate of its position, or assist another entity (e.g., a base station or core network component, another UE, a location server, a third party application, etc.) to calculate an estimate of its position. The UE 115 may communicate wirelessly with a plurality of base stations 105-1, 105-2, and 105-3 (collectively, base stations 105), which may correspond to any combination of base stations 105 in FIG. 1, using RF signals and standardized protocols for the modulation of the RF signals and the exchange of information packets. By extracting different types of information from the exchanged RF signals, and utilizing the layout of the wireless communications system 500 (i.e., the base stations locations, geometry, etc.), the UE 115 may determine its position, or assist in the determination of its position, in a predefined reference coordinate system. In an aspect, the UE 115 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 115 and three base stations 105, as will be appreciated, there may be more UEs 115 and more or fewer base stations 105.

To support position estimates, the base stations 105 may be configured to broadcast reference RF signals (e.g., PRS, CRS, CSI-RS, synchronization signals, etc.) to UEs 115 in their coverage area to enable a UE 115 to measure characteristics of such reference RF signals. For example, the UE 115 may use the OTDOA positioning method, and the UE 115 may measure the RSTD between specific reference RF signals (e.g., PRS, CRS, CSI-RS, etc.) transmitted by different pairs of network nodes (e.g., base stations 105, antennas of base stations 105, etc.).

Generally, RSTDs are measured between a reference network node (e.g., base station 105-1 in the example of FIG. 5) and one or more neighbor network nodes (e.g., base stations 105-2 and 105-3 in the example of FIG. 5). The reference network node remains the same for all RSTDs measured by the UE 115 for any single positioning use of OTDOA and would typically correspond to the serving cell for the UE 115 or another nearby cell with good signal strength at the UE 115. In an aspect, where a measured network node is a cell supported by a base station, the neighbor network nodes would normally be cells supported by base stations different from the base station for the reference cell and may have good or poor signal strength at the UE 115. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., positioning engine 101) may provide OTDOA assistance data to the UE 115 for the reference network node (e.g., base station 105-1 in the example of FIG. 5) and the neighbor network nodes (e.g., base stations 105-2 and 105-3 in the example of FIG. 5) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 115 as the reference network node.

In an aspect, while the location server (e.g., positioning engine 101) may send the assistance data to the UE 115, alternatively, the assistance data can originate directly from the network nodes (e.g., base stations 105) themselves (e.g., in periodically broadcasted overhead messages, etc.). Alternatively, the UE 115 can detect neighbor network nodes itself without the use of assistance data.

In the example of FIG. 5, the measured time differences between the reference cell of base station 105-1 and the neighboring cells of base stations 105-2 and 105-3 are represented as $\tau_2$-$\tau_1$ and $\tau_3$-$\tau_1$, where $\tau_1$, $\tau_2$, and $\tau_3$ represent the transmission time of a reference RF signal from the transmitting antenna(s) of base station 105-1, 105-2, and 105-3, respectively, to the UE 115, and includes any measurement noise at the UE 115. The UE 115 may then convert the ToA measurements for different network nodes to RSTD measurements (e.g., as defined in 3GPP TS 36.214 entitled "Physical layer; Measurements") and (optionally) send them to the positioning engine 101. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 115 position may be determined (either by the UE 115 or the positioning engine 101).

The ToA $T_i$ at the UE 115 for the shortest path from base station i is $$T_i = \tau_i + \frac{D_i}{c},$$

where $D_i$ is the Euclidean distance between the base stations i with location ($q_i$) and the UE 115 with location (p), c is the speed of light in the air (299700 km/s), and $q_i$ is known through the cell information database. The Euclidean distance (i.e., the line distance between two points) is given by:

$$c(T_i - \tau_i) = \sqrt{2} R \sqrt{1 - \sin(\varphi_1)\sin(\varphi_2) - \cos(\varphi_1)\cos(\varphi_2)\cos(\beta_1 - \beta_2)},$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 115 first jointly processes all the resource elements (REs) on the channel on which that network node (e.g., base station 105) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 115 may chose a ToA estimate that is the earliest local maximum of the CER that is at least X dB higher than the median of the CER and a maximum Y dB lower than the main peak on the channel. The UE 115 determines the CER for each reference RF signal from each network node in order to determine the ToA of each reference RF signal from the different network nodes.

When the UE 115 obtains a location estimate itself using OTDOA measured time differences, the necessary additional data (e.g., network nodes' locations and relative transmission timing) may be provided to the UE 115 by a location server (e.g., positioning engine 101). In some implementations, a location estimate for the UE 115 may be obtained (e.g., by the UE 115 itself or by the positioning engine 101) from OTDOA measured time differences and from other measurements made by the UE 115 (e.g., measurements of signal timing from GPS or other GNSS satellites). In these implementations, known as hybrid positioning, the OTDOA measurements may contribute towards obtaining the UE's 115 location estimate but may not wholly determine the location estimate.

Uplink Time Difference of Arrival (UTDOA) is a similar positioning method to OTDOA, but is based on uplink reference RF signals transmitted by the UE (e.g., UE 115). Further, transmission and/or reception beamforming at the network node and/or UE 115 can enable wideband bandwidth at the cell edge for increased precision. Beam refinements may also leverage channel reciprocity procedures in 5G NR.

Figure 6:
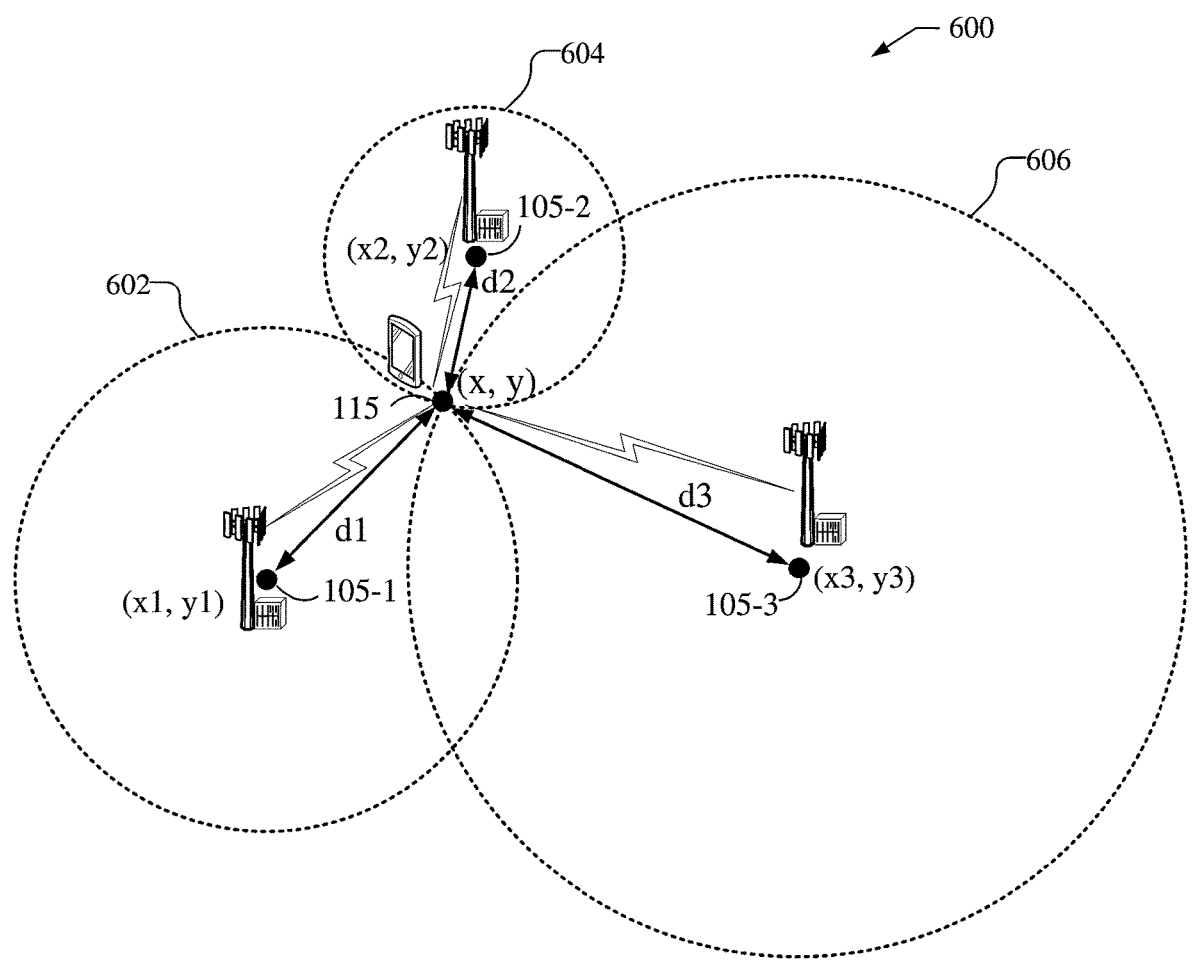
FIG. 6 is a diagram illustrating another exemplary technique for determining a position of a mobile device using information obtained from a plurality of base stations.

FIG. 6 illustrates an exemplary wireless communications system 600 including a simplified environment and an exemplary technique for determining a position of a UE 115. The UE 115 may communicate wirelessly with a plurality of base stations (gNBs) 105-1, 105-2, 105-3 (sometimes collectively referred to as base stations 105) using radio frequency (RF) signals and standardized protocols for the modulation of the RF signals and the exchanging of information packets. By extracting different types of information from the exchanged signals, and utilizing the layout of the network (i.e., the network geometry), the UE 115 may determine its position in a predefined reference coordinate system. As shown in FIG. 6, the UE 115 may specify its position (x, y) using a two-dimensional coordinate system; however, the aspects disclosed herein are not so limited, and may also be applicable to determining positions using a three-dimensional coordinate system, if the extra dimension is desired. Additionally, while three base stations are shown in FIG. 6, aspects may utilize additional gNB s.

In order to determine its position (x, y), the UE 115 may first need to determine the network geometry. The network geometry can include the positions of each of the base stations 105 in a reference coordinate system ((xk, yk), where k=1, 2, 3). The network geometry may be provided to the UE 115 in any manner, such as, for example, providing this information in beacon signals, providing the information using a dedicated server external on an external network, providing the information using uniform resource identifiers, etc.

The UE 115 may then determine a distance ($d_k$, where k=1, 2, 3) to each of the base stations 105-k (where k=1, 2, 3). As will be described in more detail below, there are a number of different approaches for estimating these distances ($d_k$) by exploiting different characteristics of the RF signals exchanged between the UE 115 and base stations 105-1, 105-2, 105-3. Such characteristics may include, as will be discussed below, the round trip time (RTT) of the signals, and/or the strength of the signals (RSSI).

In other aspects, the distances (dk) may in part be determined or refined using other sources of information that are not associated with the base stations 105. For example, other positioning systems, such as GPS, may be used to provide a rough estimate of dk. (Note that it is likely that GPS may have insufficient signal strength in the anticipated operating environments (indoors, metropolitan, etc.) to provide a consistently accurate estimate of dk. However, GPS signals may be combined with other information to assist in the position determination process.) Other relative positioning devices may reside in the UE 115 which can be used as a basis to provide rough estimates of relative position and/or direction (e.g., on-board accelerometers).

Once each distance is determined, the UE 115 can then solve for its position (x, y) by using a variety of known geometric techniques, such as, for example, trilateration. From FIG. 6, it can be seen that the position of the UE 115 ideally lies at the common intersection of all of the circles 602, 604, and 606 drawn using dotted lines. Each circle being defined by radius dk and center (xk, yk), where k=1, 2, 3. In practice, the intersection of these circles may not lie at a single point due to the noise and other errors in the networking system.

Determining the distance between the UE 115 and each base station 105 may involve exploiting time information of the RF signals. In an aspect, determining the RTT of signals exchanged between the UE 115 and any base station can be performed and converted to a distance (dk). RTT techniques can measure the time between sending a signaling message and receiving a response. These methods may utilize calibration to remove any processing delays.

As used herein, a "network node" may be a base station (e.g., a base station 105), a cell of a base station (e.g., a cell of a base station 105), a remote radio head, an antenna of a base station (e.g., an antenna of a base station 105, where the locations of the antennas of a base station are distinct from the location of the base station itself), an array of antennas of a base station (e.g., an array of antennas of a base station 105, where the locations of the antenna arrays are distinct from the location of the base station itself), or any other network entity capable of transmitting reference RF signals. Further, as used herein, a "network node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., a base station 105) corresponding to a cell of the base station. Where the term "base station" refers to multiple co-located physical transmission points, the physical transmission points may be an array of antennas (e.g., as in a Multiple Input-Multiple Output (MIMO) system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 115) and a neighbor base station whose reference RF signals the UE 115 is measuring.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

An "RF signal" comprises an electromagnetic wave that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

The term "position estimate" is used herein to refer to an estimate of a position for a UE 115, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Figure 7A:
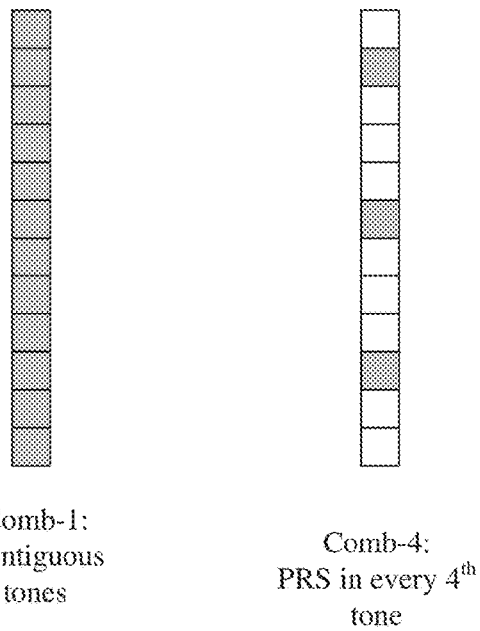
FIGS. 7A and 7B illustrate a performance comparison between comb-1 vs. comb-4.
Figure 7B:
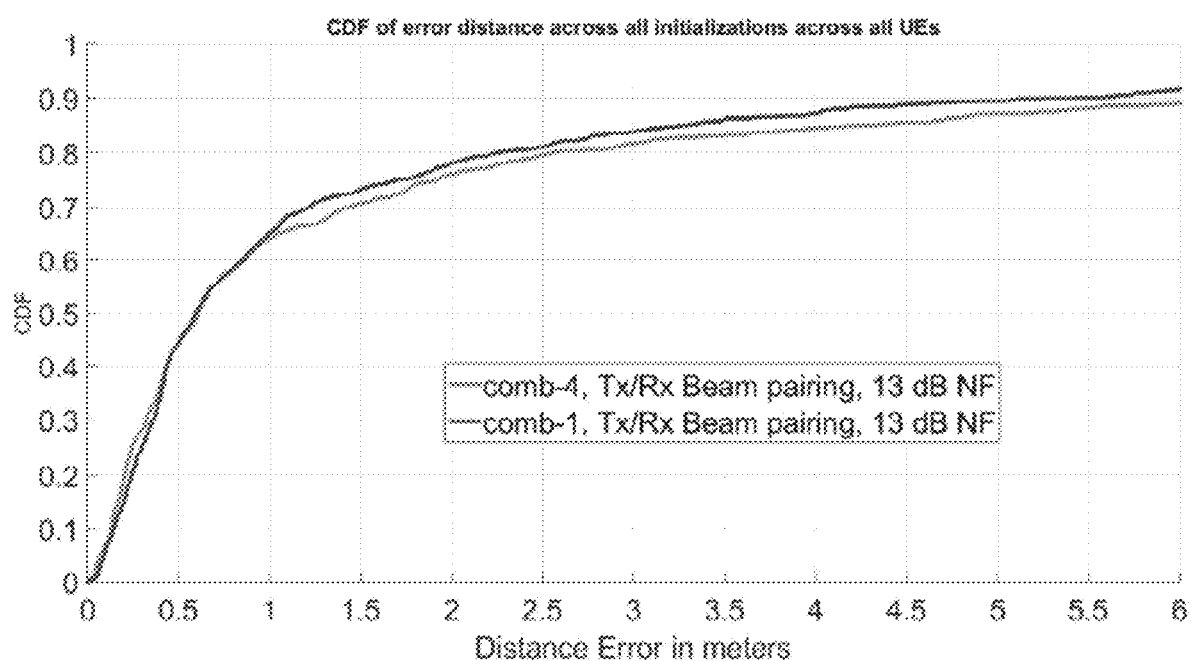

FIGS. 7A and 7B illustrate a performance comparison between comb-1 vs.comb-4. As used herein the term "comb-N" will represent that 1 of every N subcarriers of a given bandwidth of a given symbol contain a PRS, without frequency staggering (i.e., all OFDM symbols carrying a PRS contain the PRS on the same subcarriers). It will be appreciated that for comb-1, each subcarrier of the transmission bandwidth contains a PRS, whereas with comb-4, 1 in every 4 subcarriers of the transmission bandwidth contain a PRS. In FIG. 7A, each shaded block represents resource elements/subcarriers containing a PRS. The illustration of comb-1 (full comb) indicates that each subcarrier has a PRS that can be obtained by the UE. It will be appreciated that not all PRS have to be in the same OFDM symbol, but can be dispersed across various OFDM symbols. Regardless, the UE will have a PRS to be sampled in each subcarrier/tone. LTE, by way of example, uses a comb-1 or near comb-1 transmission after de-staggering. For example, LTE may transmit PRS along with additional symbols, such as CRS, which after de-staggering results in a PRS, e.g., 5 of every 6 subcarriers containing PRS for a near comb value of 1.2. Other ratios of subcarriers are used in LTE, but result in a destaggered comb value of less than 2.

In contrast, the comb-4 pattern (without additional frequency staggering) is illustrated with several resource elements/subcarriers that do not have a PRS to sample (e.g., empty blocks) and the PRS in every fourth subcarrier/tone. FIG. 7B is a graph illustrating the performance differences between the comb-1 and comb-4 PRS structures. It can be seen that performance loss appears in the tail of the cumulative distribution function (CDF) (after 60% percentile). Comb-4 has energy per resource element (EPRE) ratio of 6 dB. Although, the performance is better with the comb-1 configuration, it also increases the overhead and reduces the effective bandwidth of a given subframe, so there is an advantage to use less than all subcarriers in a subframe for PRS transmission.

Figure 8:
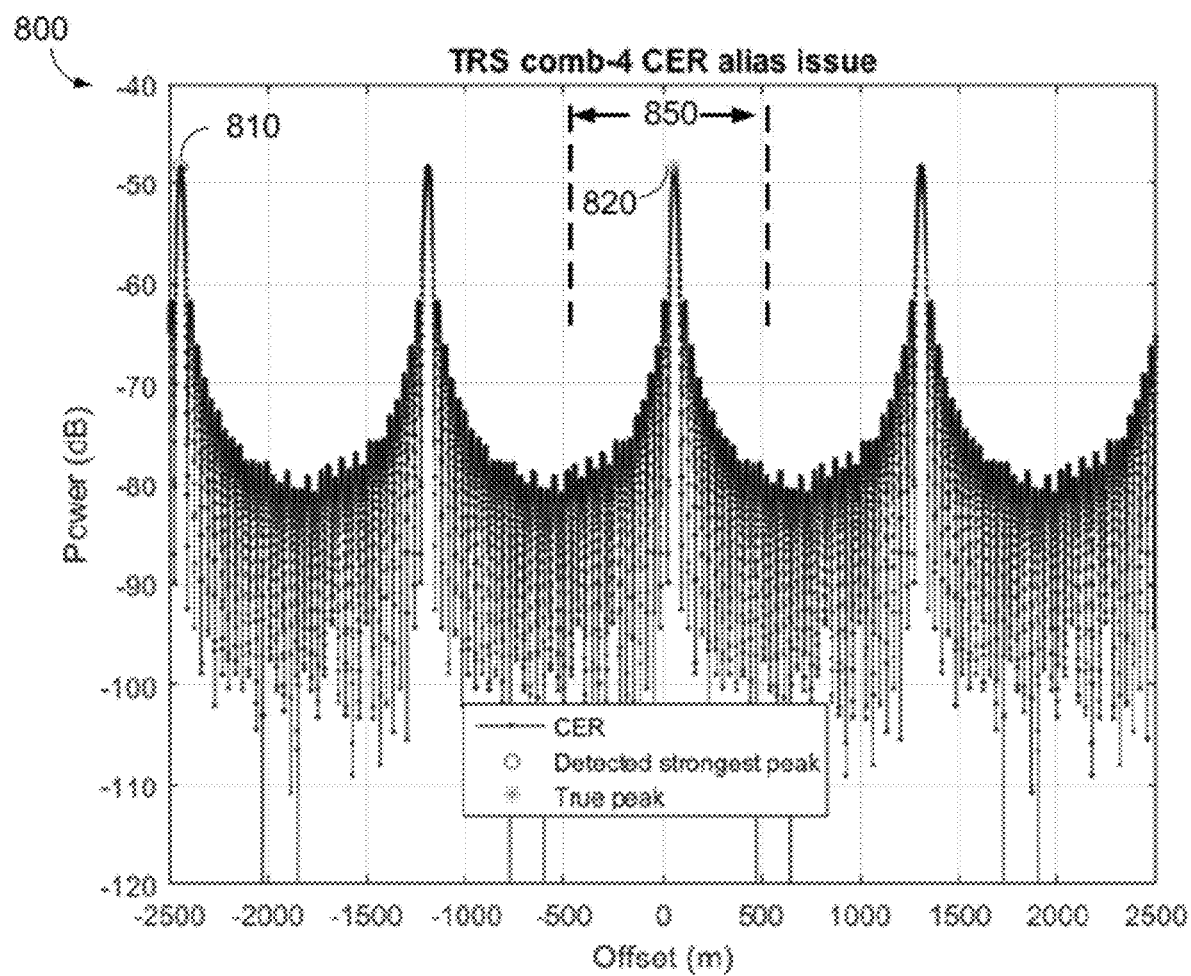
FIG. 8 is a graph illustrating a comb-4 channel energy response (CER) and potential alias issue according to at least one aspect of the disclosure.

FIG. 8 is a comb-4 channel energy response (CER) graph 800 illustrating a comb-4 CER and potential alias issue. If a cell is far away, there can be aliasing due to the frequency domain subsampling, e.g., with comb-N, where N is 2 or more. Where the comb value is less than 2 (e.g., near comb-1), such as used in LTE, significant aliasing may not be produced and may not require resolution. For example, in the comb-4 PRS structure, subsampling in the frequency domain results in the multiple peaks (four), as illustrated. A distance from each peak (x-axis in meters (m)) can be assumed based on the speed of light and time difference. As illustrated, there is approximately 1000 m between peaks. Also, as illustrated, the detected strongest peak, is an alias peak 810 of the true peak 820. This can create an offset of 2500 m, as illustrated in the example of FIG. 8. Establishing a RSTD search window based on an estimated location of the UE could mitigate the aliasing problem, when a PRS structure with a comb spacing that is equal to or greater than comb-2. For example, a RSTD search window 850 may be −2 μs to +2 μs around the 100 m position. Using the RSTD search window 850, the true peak 820 will be detected and the alias peak 810 would be discarded and the correct location will be identified. It will also be appreciated that the allowable RSTD search window is based on the PRS structure. If we have a PRS structure which does not fully sample the frequency domain, then the allowable/maximum-size of the uncertainty window should be different to address the different PRS structure. For example, if the allowable window (e.g., RSTD search window 850) was too large, it would not prevent detection of an alias peak (e.g., alias peak 810), so the allowable RSTD search window should be less than the peak to peak distance caused by the subsampling.

Figure 9:
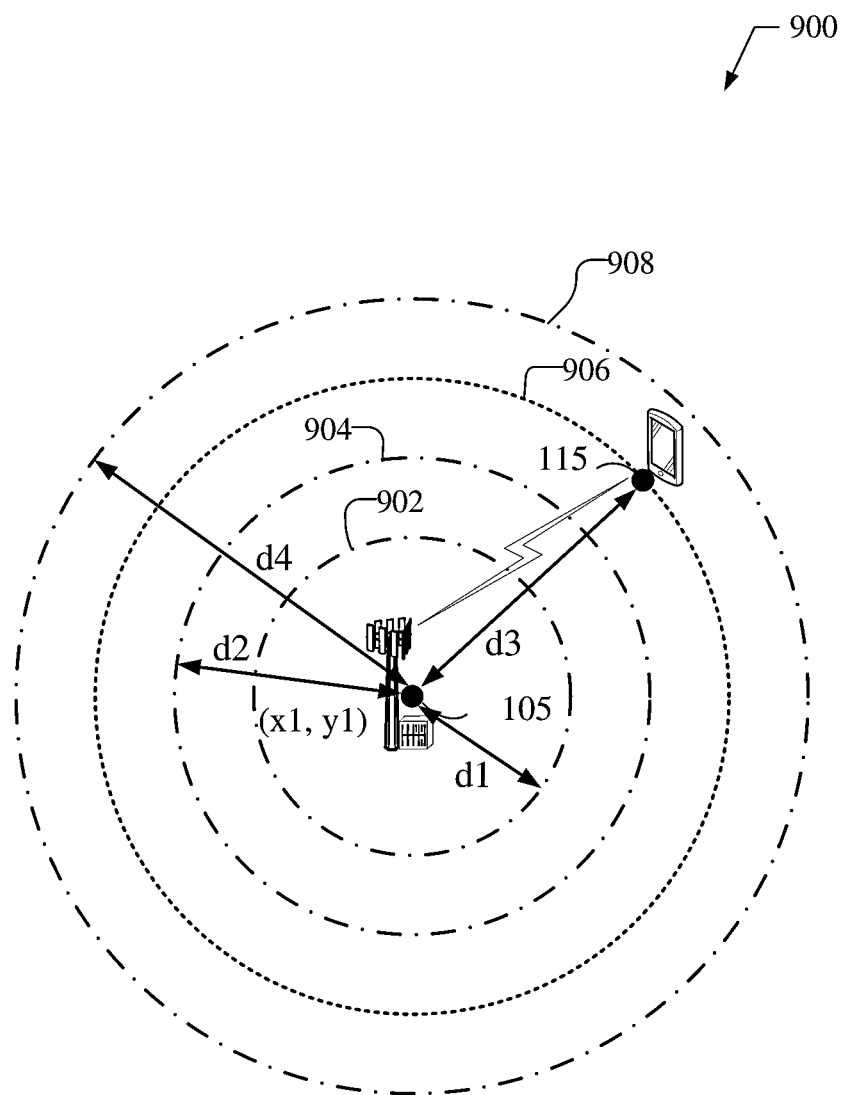
FIG. 9 illustrates an ambiguity in distances between a base station and a UE resulting from the use of a comb-4 PRS signal.

FIG. 9 illustrates a simplified environment 900 including UE 115 and base station 105 and illustrates distances d1, d2, d3, and d4 illustrated by circles 902, 904, 906, and 908, corresponding to each peak in the comb-4 CER graph 800, illustrated in FIG. 8. As illustrated, UE 115 resides at distance d3 on dotted circle 906, which, thus, provides the true position measurement value. The remaining distances, d1, d2 and d4 on dash-dot circles 902, 904, and 908, respectively, are false position measurement values and need to be eliminated in order to accurate determine the position of the UE 115.

In general, a PRS signal occupying a subset of tones of the PRS bandwidth may produce an aliasing ambiguity resulting in multiple possible positioning measurement results. For example, even with frequency staggering, aliasing ambiguities may occur, e.g., if the combs after de-staggering do not result in a comb-1 PRS. For example, a PRS signal may be comb-4 with frequency staggering, but may have less than 4 OFDM symbols, so in each group of 4 tones, PRS occupies 1,2, or 3 tones and the remaining tones are not occupied by PRS. Such a configuration may also lead to aliasing ambiguities. In particular, if PRS occupies tones 1 and 3, e.g., where tones are numbered 1, 2, 3, 4 within each block of 4, then after de-staggering, it is effectively a comb-2 signal, as described above.

Accordingly, techniques are described herein for resolving aliasing ambiguities when using a PRS signal occupying a subset of tones of the PRS bandwidth, which in some implementations may be a comb-N, with N≥2, PRS signal that produces N possible positioning measurement results due to aliasing ambiguities.

When a PRS signal occupying a subset of tones of the PRS bandwidth is used, e.g., such as with a CSI-RS transmission or a tracking reference signal (TRS), the true positioning measurement result may be determined by resolving the aliasing ambiguity with a previous position estimate. For example, the UE 115 may use the PRS signal to generate multiple possible positioning measurement results, e.g., TOA, RSTD, or Rx−Tx. The UE 115 may obtain a rough distance to the base station 105 and may use the rough distance to identify the true positioning measurement from the multiple possible positioning measurement results. For example, the UE 115 may determine a rough distance to the base station 105 based on a previous position estimate for the UE 115 and a known location of the base station 105, which may be provided in assistance data from the positioning engine 101. The previous position estimate may be determined by the UE 115, e.g., using RAT dependent process, such as OTDOA, RTT, etc., or from a RAT independent process, such as GNSS, vision based positioning, dead reckoning, etc. The previous position estimate may be provided to the UE 115 by a network entity, such as the positioning engine 101.

The UE 115 may determine a rough distance to the base station 105 using a two-stage or multi-stage PRS configuration. For example, the PRS signals may be configured with a first signal that is a comb-1 PRS signal but with possibly low bandwidth, that will produce a coarse position measurement result, but without aliasing ambiguities, i.e., a single position measurement result is produced. For example, the comb-1 PRS, both DL and UL, may be a PRS as defined in Rel16 NR in 3GPP Technical Specification (TS) 38.211. The UL PRS may sometimes be referred to as SRS for positioning, or more precisely may be referred to as SRS configured by the information element (IE) SRS-Positioning-Config. The comb-1 PRS signal may be an effective comb-1 signal after de-staggering. The PRS signals may be configured with a second signal that is the PRS signal occupying a subset of tones of a PRS bandwidth, which may have a higher bandwidth and thus produces a more accurate position but includes aliasing ambiguities. For example, the PRS may be a RS as defined in Rel15 in 3GPP TS 38.211. The coarse position measurement result produced by the comb-1 PRS signal may be used to resolve the aliasing ambiguities of the PRS signal. The comb-1 PRS signal may have a lower bandwidth and longer period than the PRS signal in order to reduce overhead. By way of example, in some cases, the first PRS configuration may be based on a synchronization signal block (SSB) signal or a subset of an SSBs. In some implementations, there may be more than two stages in the PRS configuration. For example, a plurality of PRS configurations may be used jointly to resolve the aliasing ambiguity. The PRS configurations, for example, may be separate PRS configurations, with an indication provided indicating that they should be jointly processed.

The use of a two-stage (or multi-stage) PRS configuration may implicitly indicate to the UE 115 the ambiguity resolution parameters. For example, the positioning engine 101 may indicate that the UE 115 is expected to resolve the ambiguity from a PRS signal in the second stage based on the inclusion of a first stage with a comb-1 PRS signal that can be used to determine a coarse position measurement result.

Moreover, parameters in one PRS configuration may be implicit or indicated indirectly based on parameters explicitly configured in the other PRS configuration. For example, the bandwidths or periodicities of the two (or multiple) PRS configuration may have a known relationship, e.g., a comb-N PRS signal may be twice that of the comb-1 PRS signal, or both the comb-N and comb-1 PRS signals may have the same periodicity.

Alternatively, both PRS signals may be merged into a single PRS configuration. For example, an M OFDM symbol PRS may be used, where the first M1 OFDM symbols are effective comb-1 after de-staggering, and the remaining M-M1 OFDM symbols are effective comb-N after de-staggering.

In some examples, once the UE 115 has resolved the aliasing ambiguity, the UE 115 may provide an indication to the network entity, e.g., positioning engine 101, about how the ambiguity was resolved, and the positioning engine 101 may accordingly narrow search-windows to be used by the UE 115 for the base station 105. For example, the search windows may be configured so that only one correlation peak is found within the search window.

In some examples, the aliasing ambiguities may be resolved by the positioning engine 101. For example, in a UE-assisted positioning process, the UE 115 may use the PRS signal to generate multiple possible positioning measurement results, e.g., TOA, RSTD, or Rx–Tx. The UE 115 may report the possible positioning measurement results to the positioning engine 101. In one example, the UE 115 may report only one of the multiple possible positioning measurements results, e.g., the earliest (or latest) TOA measurement, to the positioning engine 101 and the positioning engine 101 may determine the remaining positioning measurement results based on the known aliasing ambiguities, the positioning measurement result provided, and the known relationship of the provided positioning measurement result (e.g., first or last) with respect to the remaining possible positioning measurement results. The positioning engine 101 may be explicitly informed about the aliasing ambiguity, e.g., from the base station 105, or may infer it from the PRS configuration used, e.g., lack of staggering.

As with the UE 115, the positioning engine 101 may resolve the aliasing ambiguity to determine the true positioning measurement result based on a previous position estimate for the UE 115. For example, the positioning engine 101 may determine a rough distance between the UE 115 and the base station 105 and may use the rough distance to identify the true positioning measurement from the multiple possible positioning measurement results. The positioning engine 101 may determine a rough distance between the UE 115 and the base station 105 based on a previous position estimate for the UE 115 and a known location of the base station 105.

The positioning engine 101 may also determine a rough distance between the UE 115 and the base station 105 using the two-stage or multi-stage PRS configuration, discussed above. For example, UE 115 may measure the two-stage or multi-stage PRS signals discussed above, and may transmit the signals to the positioning engine 101. The positioning engine 101 may use the comb-1 PRS signals to generate a positioning measurement result that can resolve the aliasing ambiguity produced by the PRS signals, as discussed above.

Once the positioning engine 101 resolves the aliasing ambiguity, the positioning engine 101 may provide inform the UE 115 about how to resolve the ambiguity, and the UE 115 may use the information to resolve aliasing ambiguities in positioning measurement results. For example, the positioning engine 101 may implicitly inform the UE 115 about how to resolve the ambiguity by configuring a narrow search window to be used by the UE 115 for the base station 105. The search window may be configured so that, even if there are multiple correlation peaks resulting from the PRS signal, only one correlation peak may be found within the search window. In some example, it may be mandatory for the positioning engine 101 to inform the UE 115 about how to resolve the ambiguity, while in other examples, it may be optional and if not so informed, the UE 115 may report possible positioning measurement results to the positioning engine 101 and the positioning engine 101 may resolve the ambiguity.

Additionally, while the above techniques are describe referring to DL PRS received by the UE 115 from the base station 105, similar techniques may be applied for uplink (UL) SRS signals transmitted by the UE 115 and received by one or more base stations 105. For example, a base station 105 may receive from the UE a PRS signal occupying a subset of tones of a PRS bandwidth, e.g., which may be an SRS signal, and may send positioning measurement results to the positioning engine 101 to resolve the ambiguity as discussed above. In some examples, the base station may determine multiple possible positioning measurement results and may forward only one of the possible positioning measurement results, e.g., the earliest (or latest) TOA measurement, to the positioning engine 101. The positioning engine 101 may determine the remaining positioning measurement results based on the known aliasing ambiguities, the positioning measurement result provided, and the known relationship of the provided positioning measurement result (e.g., first or last) with respect to the remaining possible positioning measurement results. The positioning engine 101 may resolve the aliasing ambiguity using a previous position estimate or using a two-stage (or multi-stage) PRS configuration, as discussed above.

Figure 10:
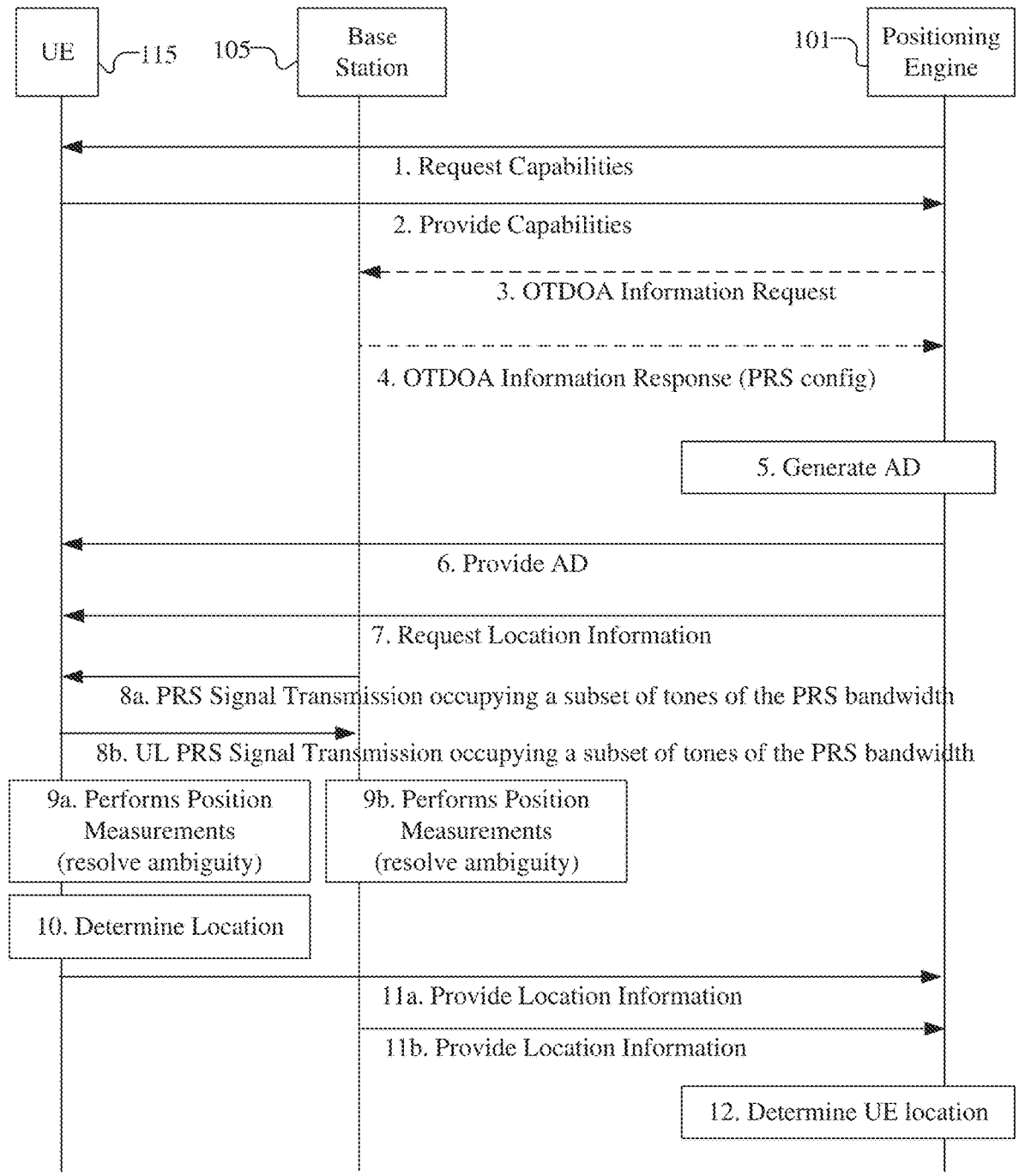
FIG. 10 illustrates a procedure which may be used to support position methods using downlink comb-N, N≥2, PRS signals.

FIG. 10 shows a procedure which may be used to support position methods in which DL PRS signals occupying a subset of tones of the PRS bandwidth are transmitted by the base station 105 are used.

At stage 1, a location server, e.g., positioning engine 101, sends a Request Capabilities message to UE 115 via the base station 105 and intervening network entities, such as an AMF (not shown) to request the positioning capabilities of UE 115. The Request Capabilities message may indicate the type of capabilities needed. For example, in the present illustration, OTDOA is desired and, thus, the UE's OTDOA capabilities are requested.

At stage 2, the UE 115 returns a Provide Capabilities message to positioning engine 101 comprising the positioning capabilities of UE 115. UE 115 may include its capability to support OTODA (or other desired positioning methods) and may include the ability to support PRS signals occupying a subset of tones of the PRS bandwidth.

At stage 3, the positioning engine 101 sends an OTDOA Information Request to the base station 105. For example, the OTDOA Information Request may request that the base station 105 provide information related to OTDOA, which may include the PRS configuration or aliasing ambiguity information.

At stage 4, the base station 105 may return an OTDOA Information Response to the positioning engine 101 providing the requested information, including the PRS configuration or aliasing ambiguity information. The OTDOA Information Request of stage 3 and the OTDOA Information Response of stage 4 may be, e.g., Long Term Evolution (LTE) Positioning Protocol A (LPPa) or New Radio Position Protocol A (NRPPa) messages.

At stage 5, the positioning engine 101 may generate OTDOA assistance data (AD), e.g., using the OTDOA Information Response from the base station 105 or OTDOA information obtained elsewhere for base station 105. The OTDOA assistance data may include assistance data for the base station 105 and other base stations that may be nearby. The OTDOA assistance data, for example, may include the locations of base stations, which may be used by the UE 115 in the resolution of any aliasing ambiguities, as discussed above. If the positioning engine 101 has previously determined an estimated position of the UE 115, the OTDOA assistance data may include a previously position of the UE 115, which may be used by the UE 115 in the resolution of any aliasing ambiguities, as discussed above. If the positioning engine 101 has previously resolved an aliasing ambiguity for the UE 115, the OTDOA assistance data may include a search window that is narrowly configured to contain only one of the correlation peaks from a PRS signal from the base station 105, which corresponds to a single position measurement result out based on the plurality of possible position measurement results.

At stage 6, the positioning engine 101 provides the OTDOA AD to the UE 115.

At stage 7, the positioning engine 101 sends a Request Location Information message to the UE 115 to request RSTD measurements. The message may include, e.g., the type of location measurements, the desired accuracy, response time, etc.

At stage 8a, the base station 105 transmits PRS signals that are received by the UE 115. The PRS signals may occupy a subset of tones of a PRS bandwidth, and may be comb-N PRS signals, where N is 2 or more. The subset of tones of the PRS bandwidth produces a plurality of possible positioning results. In some implementations, the PRS signal may be CSI-RS signals. In some examples, the PRS signals may include multiple stages, such as a comb-1 or effective comb-1 signal after de-staggering, and the PRS signal. The comb-1 PRS signal for example, may be an SSB signal or a subset of an SSB signal.

At stage 8b, the UE 115 may transmits UL PRS signals, e.g., SRS for positioning or SRS configured by the IE SRS-Positioning-Config., that are received by the base station 105. The UL PRS signals may occupy a subset of tones of a PRS bandwidth, and may be comb-N PRS signals, where N is 2 or more. The subset of tones of the PRS bandwidth produces a plurality of possible positioning results. In some examples, the UL PRS signals may include multiple stages, such as a comb-1 or effective comb-1 signal after de-staggering, and the PRS signal.

At stage 9a, the UE 115 performs the requested positioning measurement using the PRS transmissions received from the base station 105 at stage 8a. For example, the positioning measurements may be one or more of TOA, RSTD, or Rx–Tx. The UE may use the OTDOA AD from stage 6 to perform the requested positioning measurements. In one implementation, the UE 115 may determine may resolve an aliasing ambiguity in the positioning measurement results to determine the true positioning measurement result from plurality of possible positioning measurement results. In one implementation, the UE 115 may use a previous estimated position of the UE 115, obtained using RAT dependent or independent methods or obtained from the positioning engine 101, e.g., in OTDOA AD from stage 6, to determine the true positioning measurement result. For example, the UE 115 may resolve the aliasing ambiguity to determine the true positioning measurement result obtaining a rough distance between the UE and the base station, which may be obtained from a previous estimated position of the UE 115, and using the rough distance to identify the true positioning measurement result. In another example, the UE 115 may resolve the aliasing ambiguity to determine the true positioning measurement result using a comb-1 PRS signal received from stage 8a. In another example, the UE 115 may resolve the aliasing ambiguity to determine the true positioning measurement result using a plurality of PRS signals, each occupying s subset of tones of the PRS bandwidth, and determining a single position measurement result from the plurality of PRS signals, which is used to identify the true positioning measurement result. In another example, the UE 115 may use a narrow search window for the base station 105 received with the OTDOA AD from stage 6 to resolve the aliasing ambiguity to determine the true positioning measurement result.

At stage 9b, the base station 105 may perform positioning measurements using the PRS transmissions received from the UE 115 at stage 8b. For example, the positioning measurements may be one or more of TOA or Rx–Tx. In one implementation, the base station 105 resolves an aliasing ambiguity in the positioning measurement results to determine the true positioning measurement result from a plurality of possible positioning measurement results. For example, the base station 105 may resolve the aliasing ambiguity to determine the true positioning measurement result using a comb-1 PRS signal received from stage 8b.

At stage 10, if a UE-based position determination process is used, the UE 115 may determine the UE location using the true positioning measurement result after the aliasing ambiguity has been resolved, along with locations of base station 105 and other base stations 105, not shown, which may have been received in the assistance data provided at stage 6.

At stage 11a, the UE 115 provides the location information based on measurements obtained from the base station 105 and other base stations 105, not shown, to the positioning engine 101. The location information, for example, may be the true positioning measurement results, after resolving the aliasing ambiguities. In another example, the location information may be one or more measurements prior to resolving any aliasing ambiguities, e.g., where the positioning engine 101 will resolve the aliasing ambiguities, e.g., the location information may include only a single positioning measurement result, e.g., the first or last positioning measurement result of the plurality of possible positioning measurement results. In one example, the location information may be the two-stage or multi-stage PRS signals received by the UE 115 at stage 8a. If UE-based positioning determination is performed, the location information may be the UE location determined at stage 10 and may further include information such as the positioning measurements or the positioning measurement results after the aliasing ambiguity has been resolved.

At stage 11b, the base station 105 provides the location information based on PRS received from UE 115 at stage 8b and measurements obtained, if any, at stage 9b.

At stage 12, the positioning engine 101 may resolve the aliasing ambiguities if the UE 115 did not resolve the aliasing ambiguities in stage 9a or the base station 105 did not resolve the aliasing ambiguity at stage 9b. The positioning engine 101, for example, may resolve the ambiguity in a manner similar to the UE 115 as discussed in stage 9a. The positioning engine 101 may determine the UE location using the received location information, e.g., in a UE-assisted positioning process, or the positioning engine 101 may confirm the UE location if provide at stage 11a in a UE-based positioning process. The positioning engine 101 may provide the UE location to an external client.

The above described technique may be applied to uplink PRS signals, sometimes referred to as SRS for positioning or SRS configured by the IE SRS-Positioning-Config., that occupy a subset of tones of a PRS bandwidth, transmitted by the UE 115 as well, with the UE being configured to transmit on different SRS resources or resource sets, which have different effective comb densities after de-staggering, for example, a low bandwidth effective-comb-1 together with a high bandwidth effective comb-N (N≥2) SRS transmission.

Figure 11:
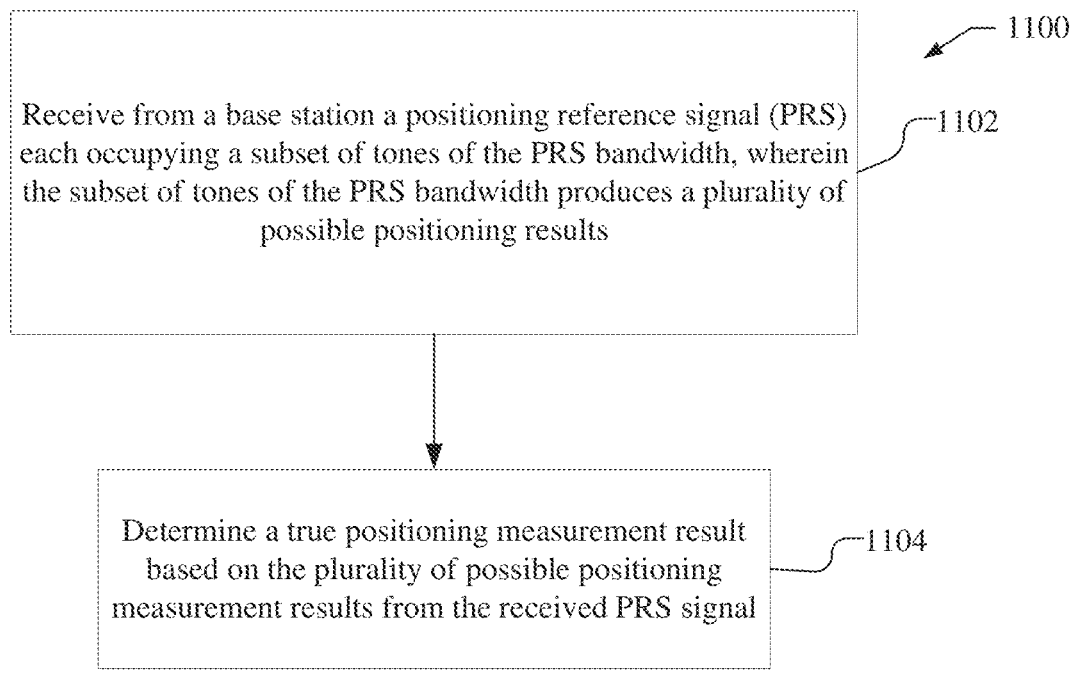
FIG. 11 shows a process flow illustrating a method for position location performed by a user equipment in which downlink comb-N, N≥2, PRS signals are used.

FIG. 11 shows a process flow 1100 illustrating a method for position location performed by a user equipment (UE), such as the UE 115.

Process flow 1100 may start at block 1102, where the UE receives from a base station a positioning reference signal (PRS) occupying a subset of tones of a PRS bandwidth, wherein the subset of tones of the PRS bandwidth produces a plurality of possible positioning results, which is illustrated, e.g., at stage 8*a* in FIG. 10. The PRS signal, for example, may be a Channel state information reference signal (CSI-RS) or a tracking reference signal (TRS). At block 1104, a true positioning measurement result based on the plurality of possible positioning measurement results is determined from the received PRS signal, e.g., as illustrated at stage 9*a* or stages 11*a* and 12 of FIG. 10.

In one implementation, positioning measurement results are produced from the PRS signal comprise one or more of Time of Arrival (TOA), Reference Signal Time Difference (RSTD), or reception to transmission difference (Rx–Tx).

In one implementation, the PRS signal is a comb-N signal, where N≥2, and wherein the comb-N PRS signal produces N possible positioning measurement results due to aliasing ambiguities, e.g., as discussed at stage 8*a* of FIG. 10.

In one implementation, determining the true positioning measurement result from the received PRS signal may include receiving a comb-1 PRS signal from the base station, determining a single positioning measurement result from the comb-1 PRS signal; and using the single positioning measurement result to identify the true positioning measurement result based on the plurality of possible positioning measurement results, e.g., as discussed at stages 8*a* and 9*a* of FIG. 10. For example, the comb-1 PRS signal from the base station may be an SSB signal.

In one implementation, determining the true positioning measurement result from the received PRS signal may include receiving a plurality of PRS signals each occupying a subset of tones of the PRS bandwidth from the base station; determining a positioning measurement result from the plurality of PRS signals; and using the positioning measurement result to identify the true positioning measurement result based on the plurality of possible positioning measurement results, e.g., as discussed at stage 9*a* of FIG. 10.

In one implementation, determining the true positioning measurement result from the received PRS signal may include determining the plurality of possible positioning measurement results from the PRS signal; obtaining a rough distance between the UE and the base station; and using the rough distance to identify the true positioning measurement result based on the plurality of possible positioning measurement results, e.g., as discussed at stage 9*a* of FIG. 10. The rough distance between the UE and the base station may be obtained, in one example, by obtaining a previous position estimate for the UE and a known location of the base station; and determining the rough distance between the UE and the base station based on the previous position estimate and the known location of the base station, e.g., as discussed at stage 9*a* of FIG. 10. The previous position estimate may be obtained using a Radio Access Technology (RAT) independent process. The previous position estimate may be obtained from a network entity, such as the positioning engine 101. In one example, the UE may transmit information related to the true positioning measurement result to a network entity; and may receive from the network entity a search window associated with the base station, wherein the search window is configured by the network entity based on the information related to the true positioning measurement result to find only a single positioning measurement result from PRS signals received from the base station, e.g., as discussed at stage 9*a* of FIG. 10.

In one implementation, determining the true positioning measurement result from the received PRS signal may include receiving a search window associated with the base station from a network entity, wherein the search window is configured to find only a single positioning measurement result in the plurality of possible positioning measurement results; and using the search window to find the true positioning measurement result based on the plurality of possible positioning measurement results, e.g., as discussed at stage 9*a* of FIG. 10.

In one implementation, the UE may perform UE-based position determination or UE-assisted position determination to determine a location of the UE using the true positioning measurement result, e.g., as discussed at stages 10, 11*a* and 12 of FIG. 10. For example, for UE-based position determination, the UE may determine the location of the UE using the true positioning measurement result, e.g., along with additional information such as the locations of base stations. For UE-assisted position determination, the UE may transmit the true positioning measurement result to a location engine and the location engine may determine the location of the UE using the true positioning measurement.

Figure 12:
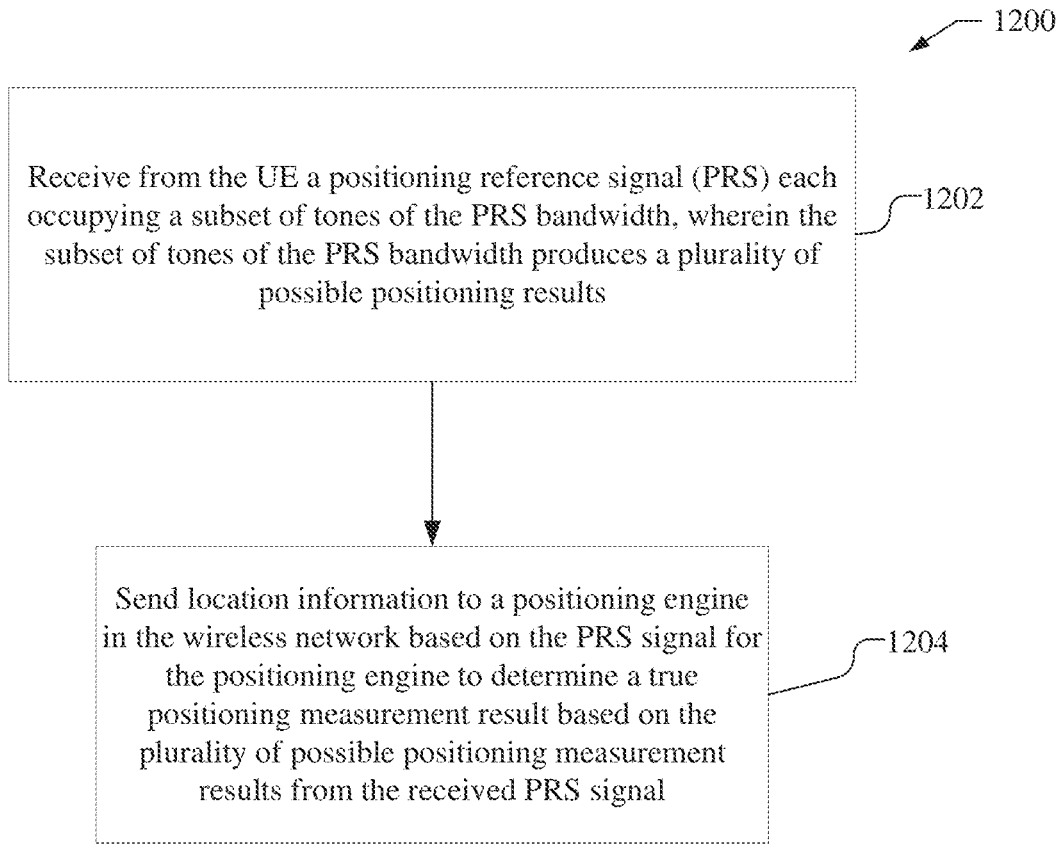
FIG. 12 shows a process flow illustrating a method for position location performed by a base station in which uplink comb-N, N≥2, PRS signals are used.

FIG. 12 shows a process flow 1200 illustrating a method for position location for a user equipment (UE) performed by a base station, such as base station 105.

Process flow 1200 may start at block 1202, where the base station receives from the UE a positioning reference signal (PRS) each occupying a subset of tones of a PRS bandwidth, wherein the subset of tones of the PRS bandwidth produces a plurality of possible positioning results, e.g., as discussed at stage 8*b* of FIG. 10. The PRS signal, for example, may be a sounding reference signal (SRS). At block 1204, the base station sends location information to a positioning engine in the wireless network based on multiple PRS signal for the positioning engine to determine a true positioning measurement result based on the plurality of possible positioning measurement results from the received PRS signal, e.g., as discussed at stage 11*b* of FIG. 10.

In one implementation, positioning measurement results are produced from the PRS signal comprise one or more of Time of Arrival (TOA) or reception to transmission difference (Rx–Tx).

In one implementation, the PRS signal is a comb-N signal, where N≥2, and wherein the comb-N PRS signal produces N possible positioning measurement results due to aliasing ambiguities.

In one implementation, the base station may determine the plurality of possible positioning measurement results from the PRS signal, wherein the location information comprises one positioning measurement result based on the plurality of possible positioning measurement results, e.g., as discussed at stage 9*b* of FIG. 10.

In one implementation, the base station may further receive one or more comb-1 PRS signals from the UE, wherein the location information comprises one or more comb-1 PRS signals and the PRS signal, e.g., as discussed at stage 8b of FIG. 10. The positioning engine may determine the true positioning measurement result based on the plurality of possible positioning measurement results based on a single positioning measurement result determined by the one or more comb-1 PRS signals and the plurality of possible positioning measurement results determined from the PRS signal.

Figure 13:
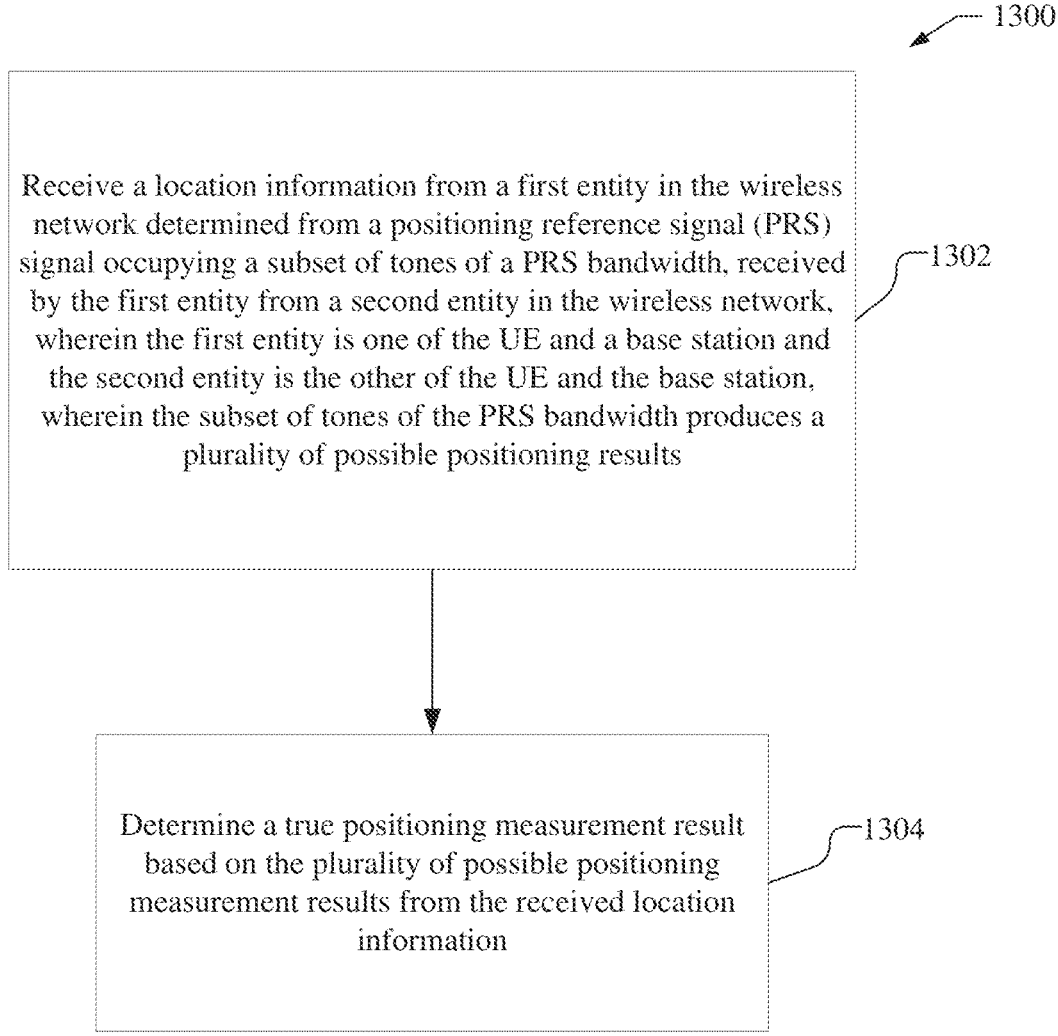
FIG. 13 shows a process flow illustrating a method for position location performed by a positioning engine in which downlink or uplink comb-N, N≥2, PRS signals are used.

FIG. 13 shows a process flow 1300 illustrating a method for position location for a user equipment (UE) performed by a positioning engine, such as positioning engine 101 shown in FIG. 1, which may be a location server such as Location Management Function (LMF) in a NR network or a Secure User Plane Location (SUPL) Location Platform (SLP) in LTE.

Process flow 1300 may start at block 1302, where the positioning engine receives a location information from a second entity in the wireless network via a first entity in the wireless network. The location information may be determined from a positioning reference signal (PRS) signal occupying a subset of tones of a PRS bandwidth. The first entity may be one of the UE, such as UE 115, or a base station, such as base station 105. The second entity may be the other, or another, of the UE and the base station. The subset of tones of the PRS bandwidth may be configured to produce a plurality of possible positioning measurement results, e.g., as illustrated at stages 11a and 11b in FIG. 10. By way of example, the first entity may be the UE and the second entity may be the base station and the PRS signal may be a channel state information reference signal (CSI-RS) or a tracking reference signal (TRS). In another example, the first entity may be the base station and the second entity may be the UE, and the PRS signal may be a sounding reference signal (SRS). At block 1304, a true positioning measurement result based on the plurality of possible positioning measurement results may be determined. Determining the true positioning measurement result may be based on the received location information, e.g., as discussed at stage 12 of FIG. 10. Determining the true positioning measurement result may use at least one of (i) a comb-1 PRS signal, (ii) a plurality of PRS signals each occupying the subset of tones of the PRS bandwidth, (iii) a rough distance between the first entity and the second entity, or (iv) a search window associated with the second entity that is configured to find a single positioning measurement result in the plurality of possible positioning measurement results.

In one implementation, the plurality of positioning measurement results produced from the PRS signal may include one or more of time of arrival (TOA), reference signal time difference (RSTD), or reception to transmission difference (Rx–Tx).

In one implementation, the PRS signal may be a comb-N signal, where N≥2. The comb-N PRS signal may produce N possible positioning measurement results due to aliasing ambiguities from the received location information.

In one implementation, the true positioning measurement result may be determined by obtaining a previous position estimate for the UE and a known location of the base station; determining the rough distance between the UE and the base station based on the previous position estimate and the known location of the base station; and using the rough distance to identify the true positioning measurement result based on the plurality of possible positioning measurement results, e.g., as discussed at stages 9a and 12 of FIG. 10. For example, the received location information may be one positioning measurement result received from the first entity, and the positioning engine may obtain information about the aliasing ambiguities; and determine the plurality of possible positioning measurement results from the one positioning measurement result received from the first entity and the information about the aliasing ambiguities. The information about the aliasing ambiguities may be received from the second entity or may be inferred from a configuration of the PRS signals.

In one implementation, the positioning engine may configure for the first entity the search window associated with the second entity that is based on the true positioning measurement result so that the first entity can find the single positioning measurement result from PRS signals received from the second entity, or in the plurality of possible positioning measurement results; and may transmit the search window to the first entity, e.g., as discussed at stages 5 and 6 of FIG. 10.

In one implementation, the received location information may be one or more of the comb-1 PRS signal or the PRS signal. The positioning engine may determine the true positioning measurement result by determining the single positioning measurement result from the one or more comb-1 PRS signal; determining the plurality of possible positioning measurement results from the PRS signal; and using the single positioning measurement result to identify the true positioning measurement result based on the plurality of possible positioning measurement results, e.g., as discussed at stages 9a and 12 of FIG. 10.

In one implementation, a location of the UE is determined using the true positioning measurement result, e.g., as discussed at stage 12 of FIG. 10.

Figure 14:
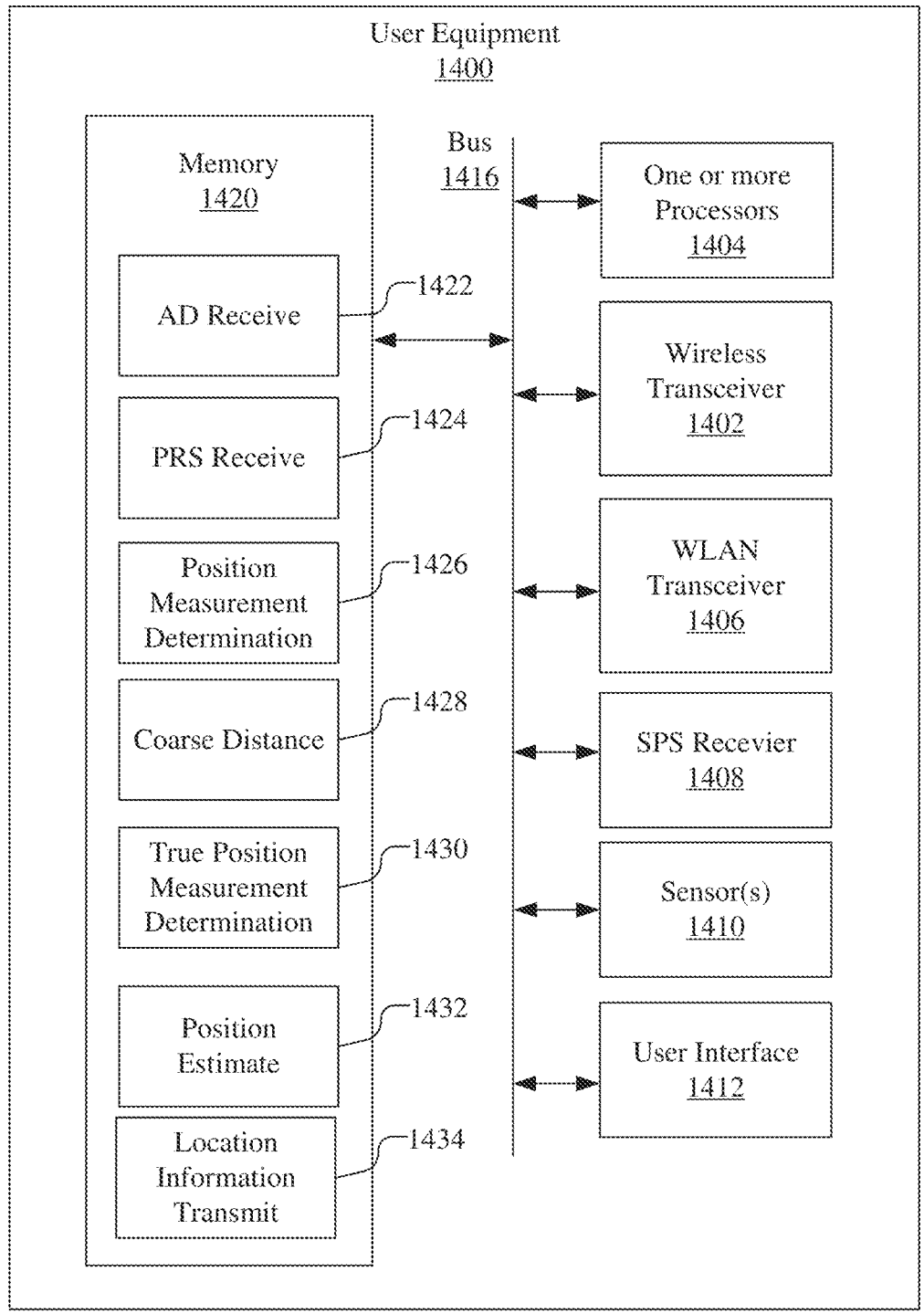
FIG. 14 is a block diagram of an embodiment of a user equipment capable of supporting use of comb-N, N≥2, PRS signals.

FIG. 14 is a diagram illustrating an example of a hardware implementation of UE 1400, such as UE 115. The UE 1400 may include a wireless transceiver 1402 to wirelessly communicate with a base station, e.g., base station 105. The UE 1400 may also include additional transceivers, such a wireless local area network (WLAN) transceiver 1406, as well as an SPS receiver 1408 for receiving and measuring signals from SPS SVs. The UE 1400 may further include one or more sensors 1410, such as cameras, accelerometers, gyroscopes, electronic compass, magnetometer, barometer, etc. The UE 1400 may further include a user interface 1412 that may include e.g., a display, a keypad or other input device, such as virtual keypad on the display, through which a user may interface with the UE 1400. The UE 1400 further includes one or more processors 1404 and memory 1420, which may be coupled together with bus 1416. The one or more processors 1404 and other components of the UE 1400 may similarly be coupled together with bus 1416, a separate bus, or may be directly connected together or coupled using a combination of the foregoing. The memory 1420 may contain executable code or software instructions that when executed by the one or more processors 1404 cause the one or more processors to operate as a special purpose computer programmed to perform the algorithms disclosed herein.

As illustrated in FIG. 14, the memory 1420 may include one or more components or modules that may be implemented by the one or more processors 1404 to perform the methodologies described herein. While the components or modules are illustrated as software in memory 1420 that is executable by the one or more processors 1404, it should be understood that the components or modules may be dedicated hardware either in the one or more processors 1404 or off the processors.

As illustrated, the memory 1420 may include assistance data receive unit 1422 that configures the one or more processors 1404 to receive assistance data, via wireless transceiver 1402 from a location server, e.g., positioning engine 101. The assistance data may include, e.g., locations of base stations, a previous estimated position for the UE 1400 or a search window.

A PRS receive unit 1424 configures the one or more processors 1404 to receive, via wireless transceiver 1402, a positioning reference signal (PRS) signal occupying a subset of tones of a PRS bandwidth from a base station, such as base station 105. The PRS signal may be a comb-N signal, where $N \geq 2$. The PRS signal produces a plurality of possible positioning measurement results due to aliasing ambiguities, wherein positioning measurement results produced by the PRS may comprise one or more of Time of Arrival (TOA), Reference Signal Time Difference (RSTD), or reception to transmission difference (Rx–Tx). The PRS receive unit 1424 may configure the one or more processors 1404 to receive comb-N PRS signals, where N may be 1 or more, e.g., where a two-stage or multi-stage PRS configuration is used.

The memory 1420 may further include a position measurement determination unit 1426 that configures the one or more processors 1404 to determine one or more, e.g., N, possible positioning measurement result from the received PRS signal. For example, the positioning measurement results may be one or more of TOA, RSTD, Rx–Tx.

The memory 1420 may further include a coarse distance unit 1428 that configures the one or more processors 1404 to obtain a rough distance between the UE and the base station. The coarse distance unit 1428 may configure the one or more processors 1404 to use a previous position estimate obtained using position estimate unit 1432, along with a known location of the base station, obtained from AD received using the AD receive unit 1422 to determine the rough distance.

The memory 1420 may further include a true position measurement determination unit 1430 that configures the one or more processors 1404 to determine the true positioning measurement result from the received PRS signal. For example, the rough distance obtained using coarse distance unit 1428 may be used to identify the true positioning measurement result based on the plurality of possible positioning measurement results. In another example, the true positioning measurement result may be identified using a comb-1 signal or a plurality of comb-N signals received using the PRS receive unit 1424 and a single position measurement determined therefrom using the position measurement determination unit 1426.

The memory 1420 may include a position estimate unit 1432 that configures the one or more processors 1404 to obtain a position estimate for the UE 1400. For example, the one or more processors 1404 may be configured to determine a position estimate from wireless signals received via wireless transceiver 1402, using OTDOA, RTT, etc. The one or more processors 1404 may be configured to determine a position estimate from RAT independent methods, such as from signals received from WLAN transceiver 1406, SPS receiver 1408, or sensors 1410, e.g., using GNSS, vision based positioning or dead reckoning. The position estimate unit 1432 may configure the one or more processors 1404 to obtain a position estimate from a network entity, such as positioning engine 101, via the wireless transceiver 1402.

A location information transmit unit 1434 configures the one or more processors to transmit location information to a positioning engine 101, via the wireless transceiver 1402. The location information, for example, may be a positioning measurement result or a position estimate determined for the UE 1400.

The methodologies described herein may be implemented by various means depending upon the application. For example, these methodologies may be implemented in hardware, firmware, software, or any combination thereof. For a hardware implementation, the one or more processors 1404 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1400 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g., memory 1420) and executed by one or more processors 1404, causing the one or more processors 1404 to operate as a special purpose computer programmed to perform the techniques disclosed herein. Memory may be implemented within the one or processors 1404 or external to the one or more processors 1404. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1400 may be stored as one or more instructions or code on a non-transitory computer-readable storage medium such as memory 1420. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1400 may be provided as signals on transmission media included in a communication apparatus. For example, a communication apparatus comprising part or all of UE 1400 may include a transceiver having signals indicative of instructions and data. The instructions and data are stored on non-transitory computer readable media, e.g., memory 1420, and are configured to cause the one or more processors 1404 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE, such as the UE 1400, may be configured for position location and may include a means for receiving from a base station a positioning reference signal (PRS) signal occupying a subset of tones of a PRS bandwidth, wherein the subset of tones of the PRS bandwidth produces a plurality of possible positioning results, which may be, e.g., the wireless transceiver 1402 and one or more processors 1404 with dedicated hardware for implementing executable code or software instructions in memory 1420 such as the PRS receive unit 1424. A means for determining a true positioning measurement result based on the plurality of possible positioning measurement results from the received PRS signal may be, e.g., the one or more processors 1404 with dedicated hardware for implementing executable code or software instructions in memory 1420 such as the true position measurement determination unit 1430.

In one implementation, the means for determining the true positioning measurement result from the received PRS signal may include a means for receiving a comb-1 PRS signal from the base station, which may be, e.g., the wireless transceiver 1402 and one or more processors 1404 with dedicated hardware for implementing executable code or software instructions in memory 1420 such as the PRS receive unit 1424; a means for determining a positioning measurement result from the comb-1 PRS signal, which may be, e.g., the one or more processors 1404 with dedicated hardware for implementing executable code or software instructions in memory 1420 such as the position measurement determination unit 1426; and a means for using the positioning measurement result to identify the true positioning measurement result based on the plurality of possible positioning measurement results, which may be, e.g., the one or more processors 1404 with dedicated hardware for implementing executable code or software instructions in memory 1420 such as the true position measurement determination unit 1430.

In one implementation, the means for determining the true positioning measurement result from the received PRS signal may include a means for receiving a plurality of PRS signals each occupying a subset of tones of the PRS bandwidth from the base station, which may be, e.g., the wireless transceiver 1402 and one or more processors 1404 with dedicated hardware for implementing executable code or software instructions in memory 1420 such as the PRS receive unit 1424; a means for determining a single positioning measurement result from the plurality of PRS signals which may be, e.g., the wireless transceiver 1402 and one or more processors 1404 with dedicated hardware for implementing executable code or software instructions in memory 1420 such as the PRS receive unit 1424, which may be, e.g., the one or more processors 1404 with dedicated hardware for implementing executable code or software instructions in memory 1420 such as the position measurement determination unit 1426; and a means for using the single positioning measurement result to identify the true positioning measurement result based on the plurality of possible positioning measurement results, which may be, e.g., the one or more processors 1404 with dedicated hardware for implementing executable code or software instructions in memory 1420 such as the true position measurement determination unit 1430.

In one implementation, the means for determining the true positioning measurement result from the received PRS signal includes a means for determining the plurality of possible positioning measurement results from the PRS signal, which may be, e.g., the one or more processors 1404 with dedicated hardware for implementing executable code or software instructions in memory 1420 such as the position measurement determination unit 1426; a means for obtaining a rough distance between the UE and the base station, which may be, e.g., the one or more processors 1404 with dedicated hardware for implementing executable code or software instructions in memory 1420 such as the coarse distance unit 1428; and a means for using the rough distance to identify the true positioning measurement result based on the plurality of possible positioning measurement results, which may be, e.g., the one or more processors 1404 with dedicated hardware for implementing executable code or software instructions in memory 1420 such as the true position measurement determination unit 1430. The means for obtaining the rough distance between the UE and the base station may include a means for obtaining a previous position estimate for the UE and a known location of the base station, which may be, e.g., the one or more processors 1404 with dedicated hardware for implementing executable code or software instructions in memory 1420 such as the position estimate unit 1432; and a means for determining the rough distance between the UE and the base station based on the previous position estimate and the known location of the base station, which may be, e.g., the wireless transceiver 1402 and one or more processors 1404 with dedicated hardware for implementing executable code or software instructions in memory 1420 such as the AD receive unit 1422 and the coarse distance unit 1428.

In one implementation, the UE may further include a means for transmitting information related to the true positioning measurement result to a network entity, which may be, e.g., the wireless transceiver 1402 and one or more processors 1404 with dedicated hardware for implementing executable code or software instructions in memory 1420 such as the location information transmit unit 1434. A means for receiving from the network entity a search window associated with the base station, wherein the search window is configured by the network entity based on the information related to the true positioning measurement result to find only a single positioning measurement result from PRS signals occupying a subset of tones of the PRS bandwidth received from the base station may be, e.g., the wireless transceiver 1402 and one or more processors 1404 with dedicated hardware for implementing executable code or software instructions in memory 1420 such as the AD receive unit 1434.

In one implementation, the means for determining the true positioning measurement result from the received PRS signal includes a means for receiving a search window associated with the base station from a network entity, wherein the search window is configured to find only a single positioning measurement result in the plurality of possible positioning measurement results, which may be, e.g., the wireless transceiver 1402 and one or more processors 1404 with dedicated hardware for implementing executable code or software instructions in memory 1420 such as the AD receive unit 1434. A means for using the search window to find the true positioning measurement result based on the plurality of possible positioning measurement results may be, e.g., the one or more processors 1404 with dedicated hardware for implementing executable code or software instructions in memory 1420 such as the true positioning measurement determination unit 1430.

Figure 15:
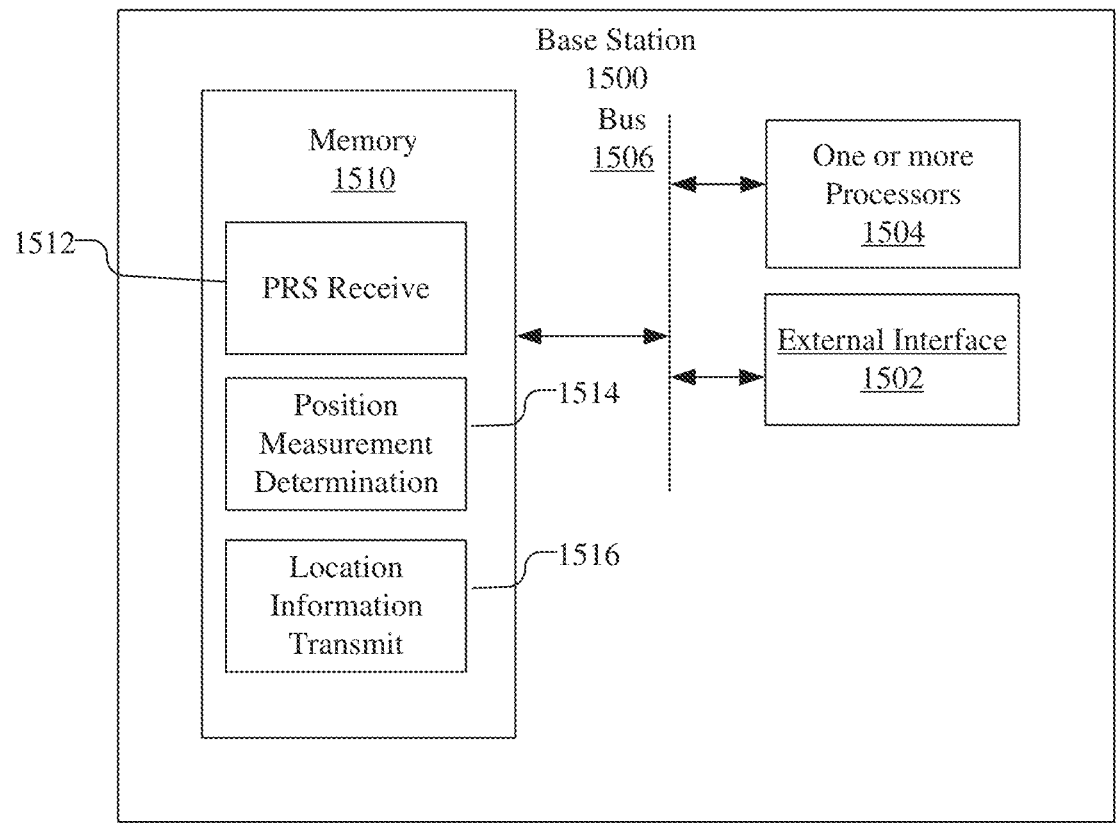
FIG. 15 is a block diagram of an embodiment of a base station capable of supporting use of comb-N, N≥2, PRS signals.

FIG. 15 is a diagram illustrating an example of a hardware implementation of a base station 1500, such as base station 105. The base station 1500 includes, e.g., hardware components such as an external interface 1502, which may be a wired and/or wireless interface capable of connecting to an positioning engine, such as positioning engine 101, and capable of wirelessly connecting to UE 115. The base station 1500 includes a one or more processors 1504 and memory 1510, which may be coupled together with bus 1506. The memory 1510 may contain executable code or software instructions that when executed by the one or more processors 1504 cause the one or more processors 1504 to operate as a special purpose computer programmed to perform the procedures and techniques disclosed herein.

As illustrated in FIG. 15, the memory 1510 includes one or more components or modules that when implemented by the one or more processors 1504 implements the methodologies as described herein. While the components or modules are illustrated as software in memory 1510 that is executable by the one or more processors 1504, it should be understood that the components or modules may be dedicated hardware either in the processor or off processor.

As illustrated, the memory 1510 may include a PRS receive unit 1512 configures the one or more processors 1504 to receive, via external interface 1502, a positioning reference signal (PRS) signal occupying a subset of tones of a PRS bandwidth from the UE, such as UE 115, wherein the subset of tones of the PRS bandwidth produces a plurality of possible positioning results. The PRS signal may be a comb-N signal and may produces N possible positioning measurement results due to aliasing ambiguities. Positioning measurement results produced by the PRS may comprise one or more of Time of Arrival (TOA) or reception to transmission difference (Rx–Tx). The PRS receive unit 1512 may configure the one or more processors 1504 to receive comb-N PRS signals, where N may be 1 or more, e.g., where a two-stage or multi-stage PRS configuration is used. The PRS signal from the UE, for example, may be a sounding reference signal (SRS).

The memory 1510 may further include a position measurement determination unit 1514 that configures the one or more processors 1504 to determine one or more, e.g., N, possible positioning measurement result from the received PRS signal. For example, the positioning measurement results may be one or more of TOA, RSTD, Rx–Tx.

The memory 1510 may further include a location information transmit unit 1516 that configures the one or more processors 1504 to transmit location information to a positioning engine 101, via the external interface 1502. The location information, for example, may be a positioning measurement result determined using position measurement determination unit 1514 or the PRS signals received using the PRS receive unit 1512.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1510, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a base station, such as the base station 1500, may be configured position location for a user equipment (UE) and may include a means for receiving from the UE a positioning reference signal (PRS) signal occupying a subset of tones of a PRS bandwidth, wherein the subset of tones of the PRS bandwidth produces a plurality of possible positioning results, which may be, e.g., the external interface 1502 and one or more processors 1504 with dedicated hardware for implementing executable code or software instructions in memory 1510 such as the PRS receive unit 1512. A means for sending a location information to a positioning engine in the wireless network based on the PRS signal for the positioning engine to determine a true positioning measurement result based on the plurality of possible positioning measurement results from the received PRS signal may be, e.g., the external interface 1502 and one or more processors 1504 with dedicated hardware for implementing executable code or software instructions in memory 1510 such as the location information transmit unit 1516.

In one implementation, the base station may further include a means for determining the plurality of possible positioning measurement results from the PRS signal, wherein the location information comprises one positioning measurement result based on the plurality of possible positioning measurement results, which may be, e.g., the one or more processors 1504 with dedicated hardware for implementing executable code or software instructions in memory 1510 such as the position measurement determination unit 1514.

In one implementation, the base station may further include a means for receiving one or more comb-1 PRS signals from the UE, wherein the location information comprises one or more comb-1 PRS signals and the PRS signal, which may be, e.g., the external interface 1502 and one or more processors 1504 with dedicated hardware for implementing executable code or software instructions in memory 1510 such as the PRS receive unit 1512; wherein the positioning engine determines the true positioning measurement result based on the plurality of possible positioning measurement results based on a single positioning measurement result determined by the one or more comb-1 PRS signals and the plurality of possible positioning measurement results determined from the PRS signal.

Figure 16:
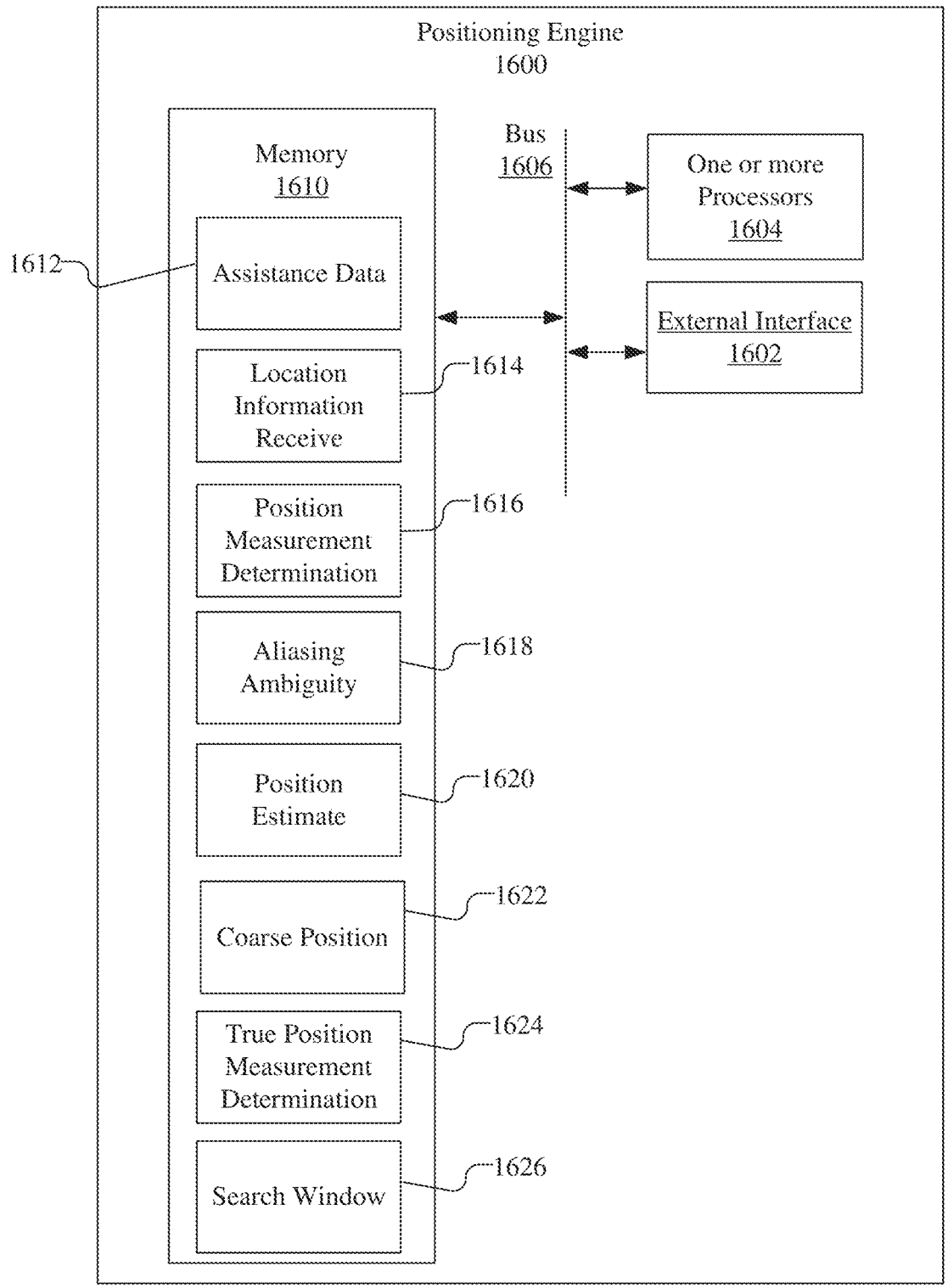
FIG. 16 is a block diagram of an embodiment of a positioning engine capable of supporting use of comb-N, N≥2, PRS signals.

FIG. 16 is a diagram illustrating an example of a hardware implementation of a positioning engine, such as positioning engine 101, which may be a location server such as Location Management Function (LMF) in a NR network or a Secure User Plane Location (SUPL) Location Platform (SLP) in LTE. The positioning engine 1600 includes, e.g., hardware components such as an external interface 1602, which may be a wired or wireless interface capable of connecting to a base station 105 and UE 115, e.g., via intermediate network entities. The positioning engine 1600 includes a one or more processors 1604 and memory 1610, which may be coupled together with bus 1606. The memory 1610 may contain executable code or software instructions that when executed by the one or more processors 1604 cause the one or more processors 1604 to operate as a special purpose computer programmed to perform the procedures and techniques disclosed herein.

As illustrated in FIG. 16, the memory 1610 includes one or more components or modules that when implemented by the one or more processors 1604 implements the methodologies described herein. While the components or modules are illustrated as software in memory 1610 that is executable by the one or more processors 1604, it should be understood that the components or modules may be dedicated hardware either in the processors 1604 or off processor.

As illustrated, the memory 1610 may include an assistance data unit 1612 that configures the one or more processors 1604 to generate assistance data and to forward the assistance data to a UE. The assistance data may include, e.g., locations of base stations, a previous estimated position for the UE or a search window.

A location information receive unit 1614 configures the one or more processors to receive location information from the UE 115 or base station 105, via the external interface 1602. The location information, for example, may be a positioning measurement result or one or more PRS signals occupying a subset of tones of a PRS bandwidth, wherein the subset of tones of the PRS bandwidth produces a plurality of possible positioning results. The PRS signals may be, e.g., a channel state information reference signal (CSI-RS) received by a UE or a sounding reference signal (SRS) received by a base station. The PRS signal may be comb-N signals that produce N possible positioning measurement results due to aliasing ambiguities. Positioning measurement results produced by the PRS signals may comprise one or more of Time of Arrival (TOA), Reference Signal Time Difference (RSTD), or reception to transmission difference (Rx–Tx)

The memory 1610 may include a position measurement determination unit 1616 that configures the one or more processors 1604 to determine one or more, e.g., N, possible positioning measurement result from the received location information. For example, if the location information includes one or more PRS signals, the position measurement determination unit 1616 may configure the one or more processors 1604 to determine the positioning measurement results, such as one or more of TOA, RSTD, Rx–Tx. If the location information includes a single positioning measurement result, the position measurement determination unit 1616 may configure the one or more processors 1604 to determine the remaining positioning measurement results from the received positioning measurement result and information from the aliasing ambiguity unit 1618. The aliasing ambiguity unit 1618 may configure the one or more processors 1604 to determine the aliasing ambiguity from information received from the base station or UE, via the external interface 1602 or inferred from the configuration of the PRS signals. The position measurement determination unit 1616 may configure the one or more processors 1604 to determine one or more, e.g., N, possible positioning measurement result using PRS signals received as location information. The position measurement determination unit 1616 may configure the one or more processors 1604 to determine a single position measurement result from a comb-1 PRS signal, or from jointly processing multiple PRS signals received as location information.

The memory 1610 may include a position estimate unit 1620 that configures the one or more processors 1604 to determine a position estimate for the UE. For example, the one or more processors 1604 may be configured to determine a position estimate from the received location information, using OTDOA, RTT, etc.

The memory 1610 may further include a coarse distance unit 1622 that configures the one or more processors 1604 to determine a rough distance between the UE and the base station. The coarse distance unit 1622 may configure the one or more processors 1604 to use a previous position estimate, obtained using position estimate unit 1620, along with a known location of the base station.

The memory 1610 may further include a true position measurement determination unit 1624 that configures the one or more processors 1604 to determine the true positioning measurement result. For example, the rough distance obtained using coarse distance unit 1622 may be used to identify the true positioning measurement result from the N possible positioning measurement results. In another example, the true positioning measurement result may be identified using a comb-1 signal or a plurality of comb-N signals received using the location information receive unit 1614 and a single position measurement determined therefrom using the position measurement determination unit 1616.

The memory 1610 may include a search window unit 1626 that configures the one or more processors 1604 to generate a search window based on the determined true positioning measurement result determined or received using the location information receive unit 1614. The search window unit 1626, for example, configures the one or more processors 1604 to produce a search window that is narrow enough that only a single positioning measurement result is found from received PRS signals. The resulting search window may be forwarded to the UE or the base station using assistance data unit 1612.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g., memory 1610) and executed by one or more processor units (e.g., processors 1604), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1610, and are configured to cause the one or more processors (e.g., processors 1604) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A positioning engine, such as the positioning engine 1600, may be configured position location for a user equipment (UE) and may include a means for receiving location information from a first entity in the wireless network determined from a positioning reference signal (PRS) signal occupying a subset of tones of a PRS bandwidth, received by the first entity from a second entity in the wireless network, wherein the first entity is one of the UE and a base station and the second entity is the other of the UE and the base station, wherein the subset of tones of the PRS bandwidth produces a plurality of possible positioning results, which may be, e.g., the external interface 1602 and one or more processors 1604 with dedicated hardware for implementing executable code or software instructions in memory 1610 such as the location information receive unit 1614. A means for determining a true positioning measurement result based on the plurality of possible positioning measurement results from the received measurement result may be, e.g., the one or more processors 1604 with dedicated hardware for implementing executable code or software instructions in memory 1610 such as the true position measurement determination unit 1624.

In one implementation, the means for determining the true positioning measurement result includes a means for obtaining a previous position estimate for the UE and a known location of the base station, which may be, e.g., the one or more processors 1604 with dedicated hardware for implementing executable code or software instructions in memory 1610 such as the position estimate unit 1620 and the assistance data unit 1612; a means for determining a rough distance between the UE and the base station based on the previous position estimate and the known location of the base station, which may be, e.g., the one or more processors 1604 with dedicated hardware for implementing executable code or software instructions in memory 1610 such as the coarse position unit 1622; and a means for using the rough distance to identify the true positioning measurement result based on the plurality of possible positioning measurement results, which may be, e.g., the one or more processors 1604 with dedicated hardware for implementing executable code or software instructions in memory 1610 such as the true position measurement determination unit 1624.

In one implementation, the received location information comprises one positioning measurement result received from the first entity, and the positioning engine may further include a means for obtaining information about the aliasing ambiguities, which may be, e.g., the one or more processors 1604 with dedicated hardware for implementing executable code or software instructions in memory 1610 such as the aliasing ambiguity unit 1618. A means for determining the plurality of possible positioning measurement results from the one positioning measurement result received from the first entity and the information about the aliasing ambiguities may be, e.g., the one or more processors 1604 with dedicated hardware for implementing executable code or software instructions in memory 1610 such as the position measurement determination unit 1616.

In one implementation, the positioning engine may further include a means for configuring for the first entity a search window associated with the second entity that is based on the true positioning measurement result so that the first entity can find only a single positioning measurement result from PRS signals received from the second entity, which may be, e.g., the one or more processors 1604 with dedicated hardware for implementing executable code or software instructions in memory 1610 such as the search window unit 1626. A means for transmitting the search window to the first entity may be, e.g., the external interface 1602 and one or more processors 1604 with dedicated hardware for implementing executable code or software instructions in memory 1610 such as the assistance data unit 1612.

In one implementation, the received measurement result comprises one or more comb-1 PRS signals and the PRS signal and the means for determining the true positioning measurement result may include a means for determining a single positioning measurement result from the one or more comb-1 PRS signals, which may be, e.g., one or more processors 1604 with dedicated hardware for implementing executable code or software instructions in memory 1610 such as the position measurement determination unit 1616. A means for determining the plurality of possible positioning measurement results from the PRS signal may be, e.g., one or more processors 1604 with dedicated hardware for implementing executable code or software instructions in memory 1610 such as the position measurement determination unit 1616. A means for using the single positioning measurement result to identify the true positioning measurement result based on the plurality of possible positioning measurement results may be, e.g., one or more processors 1604 with dedicated hardware for implementing executable code or software instructions in memory 1610 such as the true position measurement determination unit 1624.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A positioning engine in a wireless network configured for position location for a user equipment (UE), comprising:
   at least one memory; and
   at least one processor coupled to the at least one memory, the at least one processor being configured to:
      receive, via a first entity in the wireless network, location information from a second entity in the wireless network, wherein the location information is determined from a positioning reference signal (PRS) signal occupying a subset of tones of a PRS bandwidth, wherein the first entity is one of the UE and a base station and the second entity is another of the UE and the base station, wherein the subset of tones of the PRS bandwidth is configured to produce a plurality of possible positioning measurement results; and
      determine a true positioning measurement result based on the plurality of possible positioning measurement results, wherein to determine the true positioning measurement result, the at least one processor is configured to use at least one of (i) a comb-1 PRS signal, (ii) a plurality of PRS signals each occupying the subset of tones of the PRS bandwidth, (iii) a rough distance between the first entity and the second entity, or (iv) a search window associated with the second entity that is configured to find a single positioning measurement result in the plurality of possible positioning measurement results.

2. The positioning engine of claim 1, wherein the plurality of possible positioning measurement results produced from the PRS signal comprise one or more of time of arrival (TOA), reference signal time difference (RSTD), or reception to transmission difference (Rx-Tx).

3. The positioning engine of claim 1, wherein the PRS signal comprises a comb-N PRS signal, where N≥2, and wherein the comb-N PRS signal produces N possible positioning measurement results due to aliasing ambiguities from the received location information.

4. The positioning engine of claim 1, wherein the first entity comprises the UE and the second entity comprises the base station, wherein the PRS signal comprises a channel state information reference signal (CSI-RS) or a tracking reference signal (TRS).

5. The positioning engine of claim 1, wherein the first entity comprises the base station and the second entity comprises the UE, wherein the PRS signal comprises a sounding reference signal (SRS).

6. The positioning engine of claim 1, wherein to determine the true positioning measurement result, the at least one processor is configured to:
   obtain a previous position estimate for the UE and a known location of the base station;
   determine the rough distance between the UE and the base station based on the previous position estimate and the known location of the base station; and
   use the rough distance to identify the true positioning measurement result based on the plurality of possible positioning measurement results.

7. The positioning engine of claim 6, wherein the received location information comprises one positioning measurement result received from the first entity, and wherein the subset of tones of the PRS bandwidth produces the plurality of possible positioning results due to aliasing ambiguities from the received location information, wherein the at least one processor is further configured to:
   obtain information about the aliasing ambiguities; and
   determine the plurality of possible positioning measurement results from the one positioning measurement result received from the first entity and the information about the aliasing ambiguities.

8. The positioning engine of claim 7, wherein the information about the aliasing ambiguities is received from the second entity or is inferred from a configuration of the PRS signals.

9. The positioning engine of claim 1, further comprising a wireless transceiver configured to communicate with entities in the wireless network, wherein the at least one processor is configured to:
   configure for the first entity the search window associated with the second entity that is based on the true positioning measurement result so that the first entity can find the single positioning measurement result in the plurality of possible positioning measurement results; and
   transmit, via the wireless transceiver, the search window to the first entity.

10. The positioning engine of claim 1, wherein the received location information comprises one or more of the comb-1 PRS signal or comprises the PRS signal, wherein to determine the true positioning measurement result, the at least one processor is configured to:
    determine the single positioning measurement result from the one or more comb-1 PRS signal;
    determine the plurality of possible positioning measurement results from the PRS signal; and
    use the single positioning measurement result to identify the true positioning measurement result based on the plurality of possible positioning measurement results.

11. The positioning engine of claim 1, wherein the at least one processor is further configured to determine a location of the UE using the true positioning measurement result.

12. A method for position location for a user equipment (UE) performed by a positioning engine in a wireless network, comprising:
    receiving, via a first entity in the wireless network, location information from a second entity in the wireless network, wherein the location information is determined from a positioning reference signal (PRS) signal occupying a subset of tones of a PRS bandwidth, wherein the first entity is one of the UE and a base station and the second entity is another of the UE and the base station, wherein the subset of tones of the PRS bandwidth produces a plurality of possible positioning measurement results; and
    determining a true positioning measurement result based on the plurality of possible positioning measurement results, wherein determining the true positioning measurement result uses at least one of (i) a comb-1 PRS signal, (ii) a plurality of PRS signals each occupying the subset of tones of the PRS bandwidth, (iii) a rough distance between the UE and the base station, or (iv) a search window associated with the base station that is configured to find a single positioning measurement result in the plurality of possible positioning measurement results.

13. The method of claim 12, wherein the plurality of possible positioning measurement results produced from the PRS signal comprise one or more of time of arrival (TOA), reference signal T time difference (RSTD), or reception to transmission difference (Rx-Tx).

14. The method of claim 12, wherein the PRS signal comprises a comb-N PRS signal, where N≥2, and wherein the comb-N PRS signal produces N possible positioning measurement results due to aliasing ambiguities.

15. The method of claim 12, wherein the first entity comprises the UE and the second entity comprises the base station, wherein the PRS signal comprises a Channel state information reference signal (CSI-RS) or a tracking reference signal (TRS).

16. The method of claim 12, wherein the first entity comprises the base station and the second entity comprises the UE, wherein the PRS signal comprises a sounding reference signal (SRS).

17. The method of claim 12, wherein determining the true positioning measurement result comprises:
  obtaining a previous position estimate for the UE and a known location of the base station;
  determining the rough distance between the UE and the base station based on the previous position estimate and the known location of the base station; and
  using the rough distance to identify the true positioning measurement result based on the plurality of possible positioning measurement results.

18. The method of claim 17, wherein the received location information comprises one positioning measurement result received from the first entity, and wherein the subset of tones of the PRS bandwidth produces the plurality of possible positioning results due to aliasing ambiguities from the received location information, the method further comprising:
  obtaining information about the aliasing ambiguities; and
  determining the plurality of possible positioning measurement results from the one positioning measurement result received from the first entity and the information about the aliasing ambiguities.

19. The method of claim 18, wherein the information about the aliasing ambiguities is received from the second entity or is inferred from a configuration of the PRS signals.

20. The method of claim 12, further comprising:
  configuring for the first entity the search window associated with the second entity that is based on the true positioning measurement result so that the first entity can find the single positioning measurement result in the plurality of possible positioning measurement results; and
  transmitting the search window to the first entity.

21. The method of claim 12, wherein the received location information comprises one or more of the comb-1 PRS signal or comprises the PRS signal, wherein determining the true positioning measurement result comprises:
  determining the single positioning measurement result from the one or more comb-1 PRS signal;
  determining the plurality of possible positioning measurement results from the PRS signal; and
  using the single positioning measurement result to identify the true positioning measurement result based on the plurality of possible positioning measurement results.

22. The method of claim 12, further comprising determining a location of the UE using the true positioning measurement result.

* * * * *